(12) United States Patent
Rittman et al.

(10) Patent No.: US 10,521,614 B2
(45) Date of Patent: Dec. 31, 2019

(54) ELECTRONIC CIRCUITS FOR SECURE COMMUNICATIONS AND ASSOCIATED SYSTEMS AND METHODS

(71) Applicant: Gopher Protocol, Inc., Perris, CA (US)

(72) Inventors: Danny Rittman, San Diego, CA (US); Aliza Schnapp, Beverly Hills, CA (US)

(73) Assignee: GBT Technologies, Inc., Santa Monica, CA (US)

( * ) Notice: Subject to any disclaimer, the term of this patent is extended or adjusted under 35 U.S.C. 154(b) by 170 days.

(21) Appl. No.: 15/015,441

(22) Filed: Feb. 4, 2016

(65) Prior Publication Data

US 2016/0259950 A1    Sep. 8, 2016

Related U.S. Application Data

(60) Provisional application No. 62/284,744, filed on Oct. 8, 2015, provisional application No. 62/284,458, filed (Continued)

(51) Int. Cl.
*G06F 21/72* (2013.01)
*G06F 21/74* (2013.01)

(52) U.S. Cl.
CPC .............. *G06F 21/72* (2013.01); *G06F 21/74* (2013.01)

(58) Field of Classification Search
CPC .................................. G06F 21/72; G06F 21/74
See application file for complete search history.

(56) References Cited

U.S. PATENT DOCUMENTS 5,857,074 A    1/1999   Johnson
7,791,455 B1   9/2010   Maclean, III et al.
(Continued)

OTHER PUBLICATIONS

International Search Report and Written Opinion dated Apr. 22, 2016 from related International Application No. PCT/US2016/016522.
(Continued)

*Primary Examiner* — Linglan E Edwards
*Assistant Examiner* — Forrest L Carey
(74) *Attorney, Agent, or Firm* — Eric L. Lane; Green Patent Law

(57) ABSTRACT

An electronic circuit is disclosed which has a process subsystem including a compliance circuit, a microprocessor, an interrupt controller, and a bridge. The electronic circuit also has a control block including a clock manager, a reset manager, a power manager, and a system control. The electronic circuit includes a crypto-block including a master sub-block, a slave sub-block, a direct memory access circuit, a packet buffer, and a crypto-engine. An interconnect communicatively connects the process subsystem to the control block and the crypto-block. A communications system is disclosed in which the electronic circuit is housed in one or more personal computing devices. A remote disablement system may be communicatively connected to the electronic circuit and configured to disable the electronic circuit. An emergency communications system may be communicatively connected to the electronic circuit to track and identify the location of each personal computing device. An altitude detection and airplane mode activation system may be communicatively connected to the electronic circuit. A categorized delivery system may be communicatively connected to the electronic circuit.

18 Claims, 12 Drawing Sheets

Related U.S. Application Data on Oct. 1, 2015, provisional application No. 62/284,353, filed on Sep. 28, 2015, provisional application No. 62/282,593, filed on Aug. 6, 2015, provisional application No. 62/231,405, filed on Jul. 6, 2015, provisional application No. 62/176,933, filed on Mar. 3, 2015.

(56) References Cited

U.S. PATENT DOCUMENTS

| | | | |
|---|---|---|---|
| 2001/0020251 A1* | 9/2001 | Sheikh | G06F 1/20 709/224 |
| 2002/0087392 A1* | 7/2002 | Stevens | G06Q 20/202 705/7.29 |
| 2004/0059852 A1* | 3/2004 | Sun | G06F 13/4291 710/110 |
| 2006/0282271 A1 | 12/2006 | Ananda et al. | |
| 2008/0307240 A1* | 12/2008 | Dahan | G06F 1/06 713/320 |
| 2009/0013056 A1* | 1/2009 | Weinstock | G06F 3/1462 709/208 |
| 2009/0121965 A1 | 5/2009 | Palmade | |
| 2009/0157936 A1 | 6/2009 | Goss et al. | |
| 2011/0068921 A1 | 3/2011 | Shafer | |
| 2011/0093922 A1* | 4/2011 | Crosswy | H04W 88/10 726/3 |
| 2011/0211563 A1* | 9/2011 | Herrala | H04W 4/029 370/338 |
| 2011/0275343 A1* | 11/2011 | Kollar | H04W 4/20 455/404.2 |
| 2012/0047425 A1* | 2/2012 | Ahmed | G06F 17/30905 715/234 |
| 2012/0311690 A1* | 12/2012 | Ellis | G06F 21/50 726/11 |
| 2013/0127617 A1 | 5/2013 | Baade et al. | |
| 2014/0139223 A1 | 5/2014 | Olsson | |
| 2015/0028996 A1 | 1/2015 | Agrafioti | |
| 2015/0058509 A1* | 2/2015 | Uchida | G06F 13/362 710/200 |
| 2015/0074323 A1* | 3/2015 | Chumbalkar | G06F 13/4022 710/316 |
| 2015/0378520 A1* | 12/2015 | Chandrasekaran | G06F 3/0482 715/716 |
| 2016/0034663 A1* | 2/2016 | Nino | G06Q 10/10 705/2 |
| 2016/0188896 A1* | 6/2016 | Zatko | G06F 21/6218 726/30 |

OTHER PUBLICATIONS

"The appy trucker" The Economist, Mar. 5, 2016, http://www.economist.com/node/21693946/print.

European Search Report dated Sep. 18, 2018 in related European Patent Application No. 16759244.3.

Supplementary European Search Report dated Jun. 11, 2019 in related European Patent Application No. 16884138.

* cited by examiner

ELECTRONIC CIRCUITS FOR SECURE COMMUNICATIONS AND ASSOCIATED SYSTEMS AND METHODS

CROSS-REFERENCE TO RELATED APPLICATIONS

This application is a non-provisional of and claims priority to U.S. Patent Application No. 62/284,744, filed Oct. 8, 2015, U.S. Patent Application No. 62/284,458, filed Oct. 1, 2015, U.S. Patent Application No. 62/284,353, filed Sep. 28, 2015, U.S. Patent Application No. 62/282,593, filed Aug. 6, 2015, U.S. Patent Application Ser. No. 62/231,405, filed Jul. 6, 2015, and U.S. Patent Application Ser. No. 62/176,933, filed Mar. 3, 2015, each of which is hereby incorporated by reference in its entirety.

FIELD

The present disclosure relates to electronic circuits and systems and methods of secure communications utilizing electronic circuits. The present disclosure further relates to systems and methods of remote disablement, emergency communications, and activation of airplane mode utilizing electronic circuits. The present disclosure further relates to systems and methods of categorized delivery and scheduling services utilizing electronic circuits.

BACKGROUND

Connecting mobile devices to the internet has immense and well known benefits today, but also has created overwhelming security problems that were not imagined when the basic architecture of modern electronic computers was developed in 1945, which was about twenty years before networks came into use. Even then, those first networks involved a very limited number of connected computers, had low transmission speeds between them, and the network users were generally known to each other, since most networks were relatively small and local.

By contrast, the number of computers connected to the internet today is greater by a factor of many millions, broadband connection speeds are faster by a similar magnitude, and the network connections stretch worldwide and connect hundreds of millions computers together. With mobile devices added to the equation we are getting billions of computers connected together via the internet.

Connecting mobile devices and computers to the internet is mandatory in today's world; disconnection is not a feasible option given the existing global dependence on the internet. However, the ubiquity of the internet and the billions of interconnections raise grave and constant security concerns. Many current computer systems and mobile devices lack the ability to provide secure connections via private or public networks.

Many individuals and organizations store sensitive personal information such as bank account numbers and log-in and password information in computers and mobile devices. Therefore, security breaches can be devastating. Lost or stolen devices can also compromise security.

At the same time, most computer systems and mobile devices do not take full advantage of this environment. The billions of connections could be used to our benefit. If they could be adapted to customers' daily needs, they could provide the ultimate mobile system constructed from hardware and software, assisting customers to perform a wide variety of daily routines through their mobile devices. The ubiquity of the internet and interconnectedness has also improved the possibilities of identifying global positions and locations, which can be utilized in various ways. For example, computers and mobile devices could be adapted to customers' shipping needs to provide an improved mobile system that is constructed from hardware and software, assisting customers to make wise shopping decisions for the best price.

Another example is the area of fueling. Gasoline fill is a tedious procedure and interrupts daily/weekly/periodically schedules for motor vehicle owners or users. The process is time consuming, has health risks, and is considered an annoying necessity. Computers and mobile devices could be adapted to customers' shipping needs to provide the ultimate mobile system constructed from hardware and software, taking the burden of gasoline fill from vehicle owners by providing an on-demand fill at the customer's location of choice.

Yet another example is the trucking industry. The trucking industry provides an essential service to the American economy by transporting large quantities of raw materials, works in process, and finished goods over land, typically from manufacturing plants to retail distribution centers. Trucks in America are responsible for the majority of freight movement over land, and are vital tools in the manufacturing, transportation, and warehousing industries. The trucking industry handles much more cargo than trains, ships or planes; without trucks, goods could never travel from rail yards, ports and airports to their final destinations. If the trucking industry stopped rolling, the U.S. economy would grind to a halt.

Businesses of all sizes depend on the trucking industry to maintain fast delivery times and deliver products safely all over the nation. Therefore, the trucking industry is based on timetables and schedules. Every hour is essential in order to achieve market segments and be competitive, in any type of industry. In today's fast-paced world shipments are needed to be haul fast and on schedule. Companies are constantly searching for better methodologies and concepts of scheduling management and efficiency. Computers and mobile devices could be adapted to trucking customers' shipment needs to provide the ultimate mobile system constructed from hardware and software, providing a new approach and methodology to organize shipments and cargo deliveries, significantly increasing trucking services availability, and enabling a new age of cargo transportation services.

Systems that locate, track, and monitor the status of people generally utilize or incorporate known technology, including, for example, Global Positioning System (GPS) technology, inertial and non-inertial sensor devices, and signal analysis methods. However, existing systems have serious drawbacks that are based on battery power energy, available cellular services and satellite global position around earth.

For example, tracking GPS relies primarily on a line-of-sight signal acquisition, for example, caves or certain terrain. In these locations, however, the line of sight of GPS satellites may be substantially obscured and GPS signals may be highly attenuated. As a result, GPS signals are typically weaker in these types of environments so GPS receivers have difficulty receiving GPS signals and calculating accurate position information.

Inertial tracking systems typically use readings from sensors such as gyroscopes and accelerometers to estimate the relative path of personnel and/or assets. Inertial systems, however, may accumulate large errors over time due to factors such as drift in sensor offsets, sensitivity, and measurement limitations of the sensors, as well as limitations of the location determining methods (e.g., algorithms) implemented by such systems.

Signal analysis methods that use signals of the same (or different) frequencies from different reference points to compute the location of personnel and/or assets may be unfeasible due to the need to install a number of reference devices at a particular tracking location (or scene), and may further have large instantaneous errors, and outliers, due to the multi-path effects of signals traveling through various building materials.

Systems that locate, track, and monitor altitude and motion activities status of mobile devices generally utilize or incorporate known technology including, for example, gyroscope technology, inertial and non-inertial sensor devices, and signal analysis methods and apparatus. However, signal analysis methods that use signals of the same (or different) frequencies from different reference points to compute the location, altitude or motion activities of mobile devices may be limited due to the need to install a number of reference devices at a particular tracking location, and may further have large instantaneous errors, and outliers, due to the multi-path effects of signals traveling through various building materials.

These drawbacks of existing altitude monitoring methods have limited their application in various industries, including the airline industry. For example, detection and activation of a mobile device's airplane mode is an important safety issue. Airplane mode is a setting available on many mobile phones and other electronic devices that, when activated, suspends many of the device's signal transmitting functions and all cellular services (GSM, UMTS, LTE) as well as other signal-transmitting technologies such as Wi-Fi and Bluetooth, thereby disabling the device's capacity to place or receive calls or use text messaging, while still permitting use of other functions that do not require signal transmission (e.g., games, built-in camera, MP3 player). Airplane mode permits the user to operate the device while on board a commercial aircraft while in flight, where the operation of mobile phones and other devices that send or receive signals is generally prohibited due to the common belief that they can potentially impact aircraft avionics or interfere with ground mobile networks. Automatic detection of altitude and activation of a mobile device's airplane mode would be beneficial as airline staff would not need to rely on each passenger to activate it on his or her mobile device.

Therefore, there exists a need for an electronic circuit providing secure communications via private and public networks. There is also a need for a secure communications system which can disable or permanently cease operation of a computer or mobile device in the event of a security breach or theft or if the device is lost. There is a need for a communications system that can take advantage of global position and location information to provide real-time emergency communication, beacon, location identification, and tracking for mobile devices. There is also a need for a system that can automatically detect the altitude of a mobile device and activate the mobile device's airplane mode. Finally, a need exists for an electronic circuit that can serve as a platform for categorized delivery of products and services, including fueling and trucking services.

SUMMARY

The present disclosure, in its many embodiments, alleviates to a great extent the disadvantages of known electronic circuits and communications systems by providing an electronic circuit or microchip with a public unit communicating with a public network, a secured private unit communicating with a private network, and an access barrier or firewall to maintain the security of the private unit. The electronic circuit can be embedded as an independent unit within existing mobile microchips or as an independent microchip to be installed within every mobile device as a special microchip to work in conjunction with a mobile software application. The electronic circuits described herein enable heuristic based support for mobile software application. Disclosed systems and methods advantageously provide security, remote disablement capability, computing power, and heuristic based functional operations.

The present disclosure relates to any electronic circuit of any form, such as a personal computer, mobile device and/or microchip, that has an inner hardware-based access barrier or firewall that establishes a private unit disconnected from a public unit, the public unit being configured for a connection to a public network of computers including the internet. In addition, the computer's private unit is configured for a separate connection to at least one non-internet-connected private network for administration, management, and/or control of the computer and/or microchip, locally or remotely, by either a personal user or a business or corporate entity. The microchip communicates, through a secured, encrypted, private network with all other same type and others microchips on mobile devices, worldwide.

Disclosed systems and methods comprise an electronic circuit or microchip with a secured basic input/output (BIOS) system, ROM and RAM memory that is working with smartphone software application and communicates with other microchips via a separate, secured, and encrypted private network, worldwide. The electronic circuits or microchips may include a network connection for communicating with other microchips through public network of computers and mobile devices including the internet. The microchips or electronic circuits may be located within other mobile microchips or on a device's electronic board as a separated microchip.

An inner, private hardware-based access barrier or firewall may be located within the unit and communicatively secure the connection between the microchips via encrypted protocol. The protected private unit may include at least one microprocessor unit and a system BIOS located within a flash memory. The microchip can work in conjunction with a mobile software application to provide computing power and heuristic based functional operations. The inner barrier or firewall may comprise a bus with an on/off switch controlling the communication input and output systems.

Disclosed systems and methods utilize an electronic circuit and/or a microchip for remote disablement and enablement of mobile devices. The system can be configured to shut down the mobile device via remote command. In addition, the system can disable only the integrated circuit power, via remote command, and therefor cause the mobile device to cease its operation permanently. The system can also cause permanent damage to the integrated circuit, permanently ceasing its operation. Another option is to create a power spike to damage the mobile device motherboard and other microchips, causing permanent damage to the device.

Disclosed systems and methods include a virtual machine management that is configured to transmit a set of instructions to integrated circuits in order to permanently cease their or the mobile device's operation. In exemplary embodiments, a system executed on the mobile device or a computer sends a secured, encrypted, private code sequence to the integrated circuit in order to deactivate the unit, the integrated circuit, or spike the device's motherboard. The system may include an option to erase all device memory prior to its permanent deactivation or independently. The system can also re-enable the power to the electronic circuit or microchip and therefore restore its full operation, and the mobile device as well. This feature can be used for remote disablement of a mobile device due to privacy protection or law enforcement reasons.

Disclosed systems and methods utilize an electronic circuit and/or a microchip for emergency communication, beacon, location identification and tracking on mobile devices, in real time. The user may enter his or her medical information. The system can record biometric information such as the user's fingerprint and eye print for identification purposes. The system can enable GPS-based emergency communications and a location tracking feature. The system can also provide an SOS button. Once activated, the system transmits a periodic emergency signal every designated time period, identifying the mobile device location. The system can transmit the user's medical information to a remote center for professional assessment.

In exemplary embodiments, the system includes an integrated circuit unit that works in conjunction with a mobile software application. The system enables tracking of the mobile device via a unique sequence code assembled within the electronic circuit or microchip. The system may communicate directly with satellite networks and works in areas that are out of cellular/wireless range. The mobile software executed on the mobile device sends a secured, encrypted, private code sequence to the integrated circuit in order to activate the emergency procedure for locating and tracking. The electronic circuit or microchip directly communicates via satellite with all the other disclosed circuits or microchips within mobile devices, worldwide, in order to provide the emergency communication, location identification and tracking feature.

Exemplary embodiments include systems and methods of automatic altitude and motion activity detection along with airplane mode activation or deactivation on mobile devices. Exemplary embodiments use an integrated circuit that works in conjunction with a mobile software application to identify the altitude and motion activities of the mobile device. The location, altitude and motion activities identification of mobile devices includes smartphones, tablets, mobile computers and PDMs. Exemplary systems and methods enable automatic activation or deactivation of airplane mode upon a mobile device's airborne condition identification. In exemplary embodiments, the system forms a virtual machine system and method for automatic altitude and motion activities detection and activation or deactivation based on satellite and short wave information. The system may also include a private, secured communication channel in order to communicate with other electronic circuits to exchange information and data regarding the mobile device's physical status and motion activities.

In exemplary embodiments, an electronic circuit comprises a process subsystem including a compliance circuit, a microprocessor, an interrupt controller, and a bridge. The electronic circuit further comprises a control block including a clock manager, a reset manager, a power manager, and a system control. The electronic circuit also has a crypto-block including a master sub-block, a slave sub-block, a direct memory access circuit, a packet buffer, and a crypto-engine. An interconnect communicatively connects the process subsystem to the control block and the crypto-block. The electronic circuit may further comprise a memory controller communicatively connected to the interconnect. The electronic circuit may further comprise a phase locked loop and an oscillator circuit communicatively connected to the control block.

Exemplary embodiments include an electronic circuit comprising at least one public unit, at least one private unit, and at least one barrier located between the public unit and the private unit. The private unit may further include a central controller. The public unit includes a first microprocessor and a first network connection. The private unit includes a basic input/output system, a second microprocessor, and a second network connection. In exemplary embodiments, the basic input/output system is located in a nonvolatile memory. The barrier communicatively connects the private unit and the public unit and separates the private unit from the public unit.

In exemplary embodiments, the first network connection connects to a public network, and the second network connection connects to a private network. In exemplary embodiments, the second network connection is a wired connection. The barrier may communicatively connect the private unit and the public unit. The barrier may include a signal interruption mechanism. In exemplary embodiments, the signal interruption mechanism is a bus having an on/off switch controlling communication input and output.

Exemplary embodiments of a communications system comprise one or more personal computing devices wherein each personal computing device houses an electronic circuit. In exemplary embodiments, the electronic circuit comprises a process subsystem including a compliance circuit, a microprocessor, an interrupt controller, and a bridge. The electronic circuit further comprises a control block including a clock manager, a reset manager, a power manager, and a system control. The electronic circuit also has a crypto-block including a master sub-block, a slave sub-block, a direct memory access circuit, a packet buffer, and a crypto-engine. An interconnect communicatively connects the process subsystem to the control block and the crypto-block. The electronic circuit may further comprise a memory controller communicatively connected to the interconnect. The electronic circuit may further comprise a phase locked loop and an oscillator circuit communicatively connected to the control block. The system may further comprise an antenna embedded within the electronic circuit and/or located outside the electronic circuit and communicatively connected to the electronic circuit.

The electronic circuit may have at least one public unit, at least one private unit, and at least one barrier located between the public unit and the private unit. The public unit includes a first microprocessor and a first network connection connecting to a public network. The private unit includes a basic input/output system, a second microprocessor, and a second network connection connecting to a private network. The barrier communicatively connects the private unit and the public unit and separates the private unit from the public unit via signal interruption mechanism.

In exemplary embodiments, the private unit further includes a central controller having a master control unit. Communications between the private unit and the public unit may be controlled via the private network. Advantageously, the electronic circuit can be simply and effectively connected to the internet and communicate with all other electronic circuits via private, secured, and encrypted network, providing the ultimate computing power. In exemplary embodiments, the master control unit controls at least one operation executed by the second microprocessor. Any or all of these private units can be administered, managed, and/or controlled by a personal or corporate computer/ microchip through the use of one or more separate and secured, encrypted internet based networks. By thus avoiding any connection whatsoever to the generally insecure public internet, connection of the computer's private unit to the secure private network allows for all the well-known speed, efficiency and cost effectiveness of network connection while still completely avoiding the incalculable risk of internet connection.

Exemplary embodiments of a communications system further comprise a self-diagnostic system communicatively connected to the electronic circuit and being configured to forecast and detect internal malfunctions. An exemplary communications system may further comprise a remote disablement system communicatively connected to the electronic circuit and being configured to disable the electronic circuit. In exemplary embodiments, the remote disablement system comprises a virtual machine management unit configured to transmit instructions to the electronic circuit. An exemplary communications system may further comprise an emergency communications system communicatively connected to the electronic circuit to track and identify the location of each personal computing device.

Disclosed systems and methods utilize an electronic circuit or microchip to facilitate scheduling categorized delivery and/or service, according to demand, to the customer's desired location by smartphone, the internet, or by a land line phone call. Disclosed systems provide for a categorized, on-demand delivery service by receiving by a computer-based, smartphone software, categorized delivery service request from customers, said categorized delivery order to ultimately be delivered to the customer's location. Then the system posts the delivery and/or service request via a smartphone application or via web based software. The system receives via a website by a computer based software or by smartphone application software a delivery and/or service request from prospective customers and alerts transporters/service providers according to their category.

The systems and methods may include obtaining from a customer a delivery or service request, according to the customer's desired category, via smartphone application or web site, phone call or phone messaging. In exemplary embodiments, the system identifies an origin-destination-pair and schedules a categorized delivery and/or service to the customer's desired location.

Disclosed systems and methods include automatic identification of one or more available, registered, categorized, transporters to provide the delivery and/or service. In exemplary embodiments, the system dispatches the categorized transporter to the customer's location and notifies the customer about the estimate arrival time (ETA), as well as the actual arrival. The system can also provide a visual transporter's progress via GPS map, which enables a customer's update about the delivery and/or service arrival's progress. The system may include a rating system for the customer's convenience. Customers can pay at the time of service to the transporter/service provider according their mutual agreement.

In exemplary embodiments, a communication system further comprises a categorized delivery system communicatively connected to the electronic circuit. The categorized delivery system comprises a service request module, an identification module, a scheduling module, a dispatch module, and a notification module. The service request module obtains a service request and a service location from a customer. The identification module locates service providers matching the customer's service request and service location and identifies an origin-destination pair comprising a matching service provider and customer.

In exemplary embodiments, the scheduling module schedules a service order for the customer at the service location, and the dispatch module dispatches the service provider to the service location. The notification module communicates to the customer an estimated arrival time of the service provider at the service location to fulfill the service order. Exemplary embodiments further comprise a posting module configured to allow a customer to place the service request. In exemplary embodiments, the service order is one or more of delivery of a package, fueling of a vehicle, and trucking service.

Disclosed systems and methods utilize an electronic circuit or microchip to facilitate scheduling gasoline or diesel (hereinafter "fuel") fill according to demand, at the customer's location by smartphone, the internet, or by land line phone call. The method may include obtaining from a customer a gasoline filing request via smartphone, the internet, phone call, or phone messaging. The system may identify an origin-destination-pair and schedule gas filling service at the customer's location. The method also includes automatically identifying one or more available gasoline transporters to provide the service. In exemplary embodiments, the system dispatches the gasoline provider to the customer's location and notifies the customer the ETA, as well as the actual arrival. Customers can pay at the time of service, pre-pay in advance, or be billed at a later time.

Disclosed systems and methods utilize an electronic circuit or microchip to facilitate scheduling trucking service according to demand, at the customer's or any other location by smartphone, the internet, or land line phone call. The method may include obtaining from a customer a trucking service request via smartphone, the internet, phone call, or phone messaging. The system identifies an origin-destination-pair and schedules trucking service at the customer's or any location. The method also may include automatically identifying one or more available truckers in local vicinity or radius defined by the user to provide the service.

In exemplary embodiments, the system dispatches the trucker to the customer's or any other location and notifies the customer of the ETA as well as the actual arrival. The system may collect from the customer the transported cargo's information and present it to the available truckers. Upon cargo delivery the system may provide an invoice with a graphic description of the route, the total miles, and the cost. Customers can pay at the time of service, pre-pay in advance, or be billed at a later time. The system may show the trucker's progress on GPS map via smartphone.

Accordingly, it is seen that electronic circuits are provided which provide secure communications and, as a platform technology, provide a number of additional features and advantages such as remote disablement and enablement capabilities, emergency location and tracking ability, and categorized delivery and service functions. These and other features of the disclosed embodiments will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects. Reference to materials, configurations, directions, and other parameters should be considered as representative and illustrative of the capabilities of exemplary embodiments, and embodiments can operate with a wide variety of such parameters. It should be noted that the figures do not show every piece of equipment, nor the materials, configurations, and directions of the various circuits and communications systems.

Figure 1:
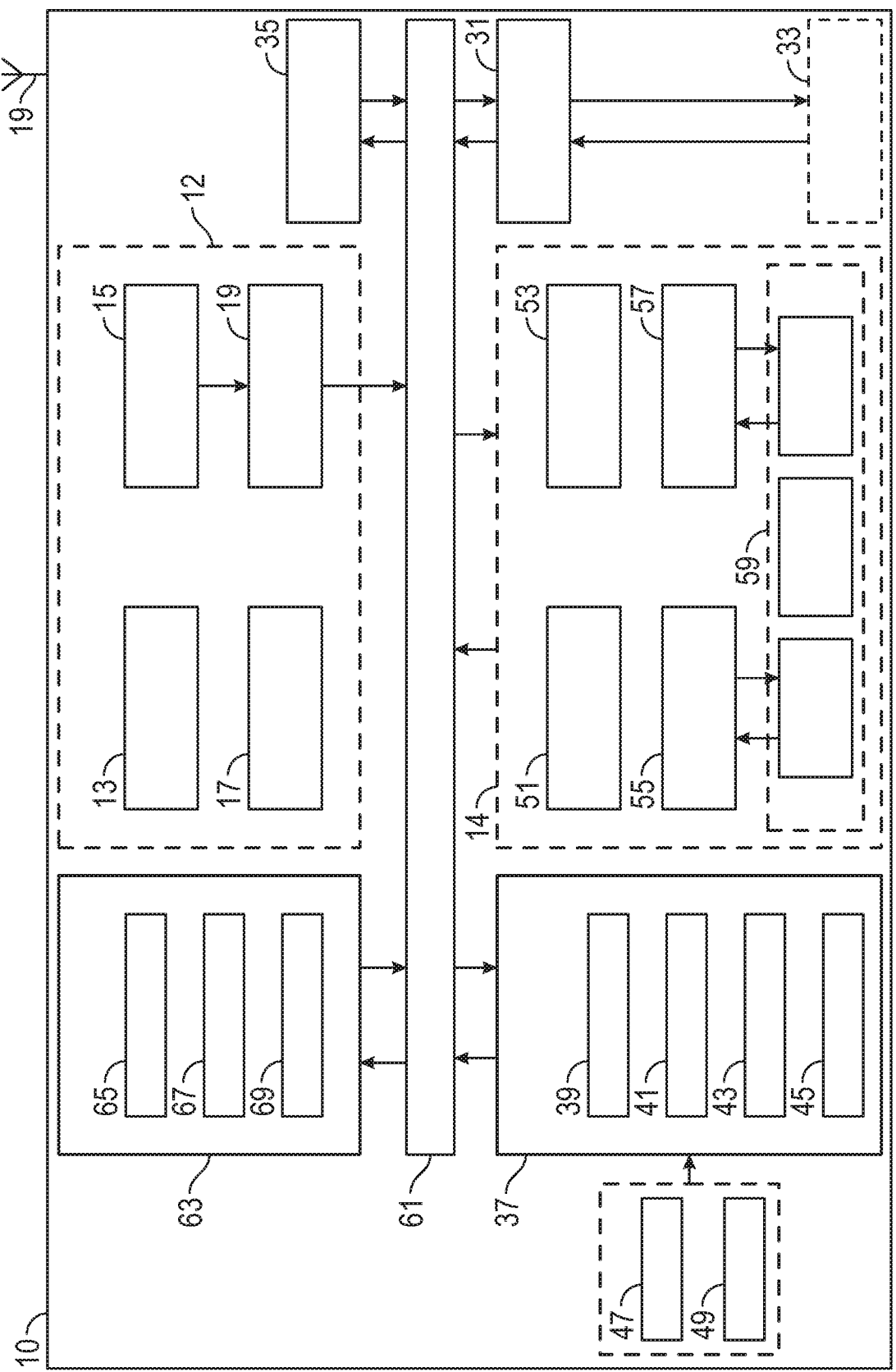
FIG. 1 is a schematic of an exemplary embodiment of an electronic circuit in accordance with the present disclosure.

An exemplary embodiment of an electronic circuit (also referred to as an integrated circuit or microchip) is illustrated in FIG. 1. The electronic circuit can be of any form, e.g., a personal computer, a mobile device such as a smartphone, or a microchip. Any type of electronic circuit or microchip could be used and configured as described herein, including but not limited to, a low noise amplifier (LNA) type circuit, a customized voltage controlled oscillator (VCO) type circuit, a phase locked loop (PLL) type circuit, a low pass filter (LPF) type circuit, a notch filter type circuit, and/or a serializer and de-serializer (SERDES) type circuit.

Referring to FIG. 1, an exemplary electronic circuit 10 comprises a process subsystem 12 including a compliance circuit 13, a microprocessor 15, an interrupt controller 17, and a bridge 19. The compliance circuit 13 may be a Debug or joint test action group circuit. The microprocessor 15 may be a Cortex Mx circuit. In exemplary embodiments, the interrupt controller 17 is a nested vectored interrupt controller. The bridge 19 may be an automatic half barrier (AHB-AXI) circuit. The electronic circuit 10 further comprises a control block 37 including a clock manager 39, a reset manager 41, a power manager 43, and a system control 45. The electronic circuit also has a crypto-block 14 including a master sub-block 51, a slave sub-block 53, a direct memory access circuit 55, a packet buffer 57, and one or more crypto-engines 59.

An interconnect 61 communicatively connects the process subsystem 12 to the control block 37 and the crypto-block 14. The interconnect circuit 61 serves as a general interface to the various sub-blocks of the electronic circuit 10. The electronic circuit 10 may include one or more network connections that can communicatively connect the electronic circuit to a public network of computers, which could be linked by the internet. One of the network connections can communicatively connect the electronic circuit 10 to a private network of computers, separate and distinct from the public network. The network connections can be wireless or wired connections. For additional security, a private network connection may be a wired connection to the private network, and one or more sub-blocks of the electronic circuit 10 may also be configured so they cannot connect to the internet. In exemplary embodiments, the one or more sub-blocks of the electronic circuit 10 are not connected to the internet and other sub-blocks are connected to the internet.

The electronic circuit 10 may include a memory controller 31 comprised of a memory controller circuit. An external memory interface 33 may be in communication with the memory controller 31 via a memory interface port. The memory interface can be of SD, Flash or other volatile memory access. There may also be an on-chip RAM 35 comprised of on-chip RAM IP. In exemplary embodiments, the electronic circuit 10 may further comprise an antenna 19 embedded within the electronic circuit and/or located outside the electronic circuit and communicatively connected to the electronic circuit.

In exemplary embodiments, a control block 37 includes a clock manager 39, which may be comprised of a clock manager circuit, to set the internal clock rate and pace. A reset manager 41, or clock reset circuit, may also be in the control block 37. A power manager 43 in the control block 37 automatically controls the unit's power. The system control 45 uses control logic to synchronize between the system's parts and I/O devices. A phase locked loop 47 to maintain certain frequency and an oscillator circuit 49 are in communication with the control block 39.

In exemplary embodiments, the crypto-block 14 includes a master advanced extensible interface 51. The master advanced extensible interface 51 is the master sub-block. A slave advanced extensible interface 53 is also provided for the encryption block. This is the slave sub-block. The crypto-block 14 may also include a direct memory access circuit 55, which enables fast, immediate direct access to memory when necessary. In exemplary embodiments, a packet buffer 57 serves as a register to store packets of data for the memory. A crypto engine 59 provides the private communication protocol encryption at 512 or 1024 bit. Exemplary embodiments may include certain peripherals 63 in communication with the interconnect 61 of the electronic circuit 10. Such peripherals could include a general purpose input/output 65, an L2 GPS frequency circuit 67, and/or a single PORT interface 69 serving as a standard PORT to connect with other devices.

Exemplary electronic circuit architecture may be arranged to have some forms of a public unit and a private unit. A barrier may be located between the public unit and the private unit. The public unit may include a network connection that can communicatively connect the electronic circuit 10 to a public network of computers, which could be linked by the internet. A second network connection may be located within the private unit. The second network connection can communicatively connect the electronic circuit 10 to a private network of computers, separate and distinct from the public network. The network connections can be wireless or wired connections. For additional security, the second network connection may be a wired connection to the private network, and the private unit may also be configured so it cannot connect to the internet. In exemplary embodiments, the private unit is not connected to the internet and the public unit is connected to the internet.

A barrier may be located between the public and private units, sub-blocks, or groups of sub-blocks. It should be noted that the barrier is not necessarily located physically between the two units, sub-blocks, or groups of sub-blocks; rather, it stands between them for communication purposes, separating the private unit from the public unit for security while at appropriate times serving as an interconnect to communicatively connect the two units. The barrier may also separate the first and second network connections. More particularly, the barrier may be an inner hardware-based access barrier or inner hardware-based firewall. An exemplary barrier has a signal interruption mechanism to prevent communications between the private and public units, sub-blocks, or groups of sub-blocks when necessary or desirable. In exemplary embodiments, the signal interruption mechanism is a bus having an on/off switch that controls communication input and output.

The signal interruption mechanism may be a secure, out-only bus or equivalent wireless connection. In general, the secure control bus may be wired, wireless or channel communication. In exemplary embodiments, the private and public units, sub-blocks, or groups of sub-blocks may also be connected by an in-only bus (or equivalent wireless connection) that includes a hardware input on/off switch or equivalent signal interruption mechanism, including an equivalent circuit on a microchip or nano-chip (or equivalent wireless connection). In another exemplary embodiment, the private and public units, sub-blocks, or groups of sub-blocks may be connected by an output on/off switch or microcircuit or nano-circuit equivalent on the secure, out-only bus (or equivalent wireless connection) in order to secure and encrypt the embedded electronic circuit or microchip communication protocol.

In exemplary embodiments, the private unit of the electronic circuit or microchip includes a private microprocessor and a system BIOS. The system BIOS may be located in flash or in a non-volatile memory. In exemplary embodiments, the memory containing the system BIOS is located in a portion of the electronic circuit or microchip protected by the inner hardware-based access barrier or firewall.

In exemplary embodiments, a private unit of an electronic circuit could comprise an outer private unit, an intermediate more private unit, and an innermost private unit. The protected private unit of the electronic circuit or microchip could include a central controller, including a master controlling device or a master control unit. In exemplary embodiments, the master controlling device comprises a master microprocessor, core or processing unit configured for general purposes.

Similarly, one or more public units, sub-blocks, or groups of sub-blocks of the electronic circuit 10 include a public microprocessor. This microprocessor is separate from the barrier. The public microprocessor may be configured to operate as a general purpose microprocessor. In exemplary embodiments, the public unit of the electronic circuit or microchip includes a number of microprocessors or processing units or cores, including but not limited to, 2, 4, 8, 16, 32, 64, 128, 256, 512, or 1024. The master controlling device may include a non-volatile memory such as RAM and/or ROM memory, and the electronic circuit 10 may also include a re-writable flash memory. Volatile memory like flash that has read/write ability can function as an inexpensive read-only memory (ROM) when located in the private unit because it can be protected by an access barrier or firewall against writing. Furthermore, it can even be protected against unauthorized reading, unlike ROM. Moreover, it can be written to when authorized by the central controller to update an operating system or download an app, for example, again unlike ROM. In exemplary embodiments, an integrated, hybrid, LOOP based antenna is embedded within the microchip and outside the microchip.

Figure 2:
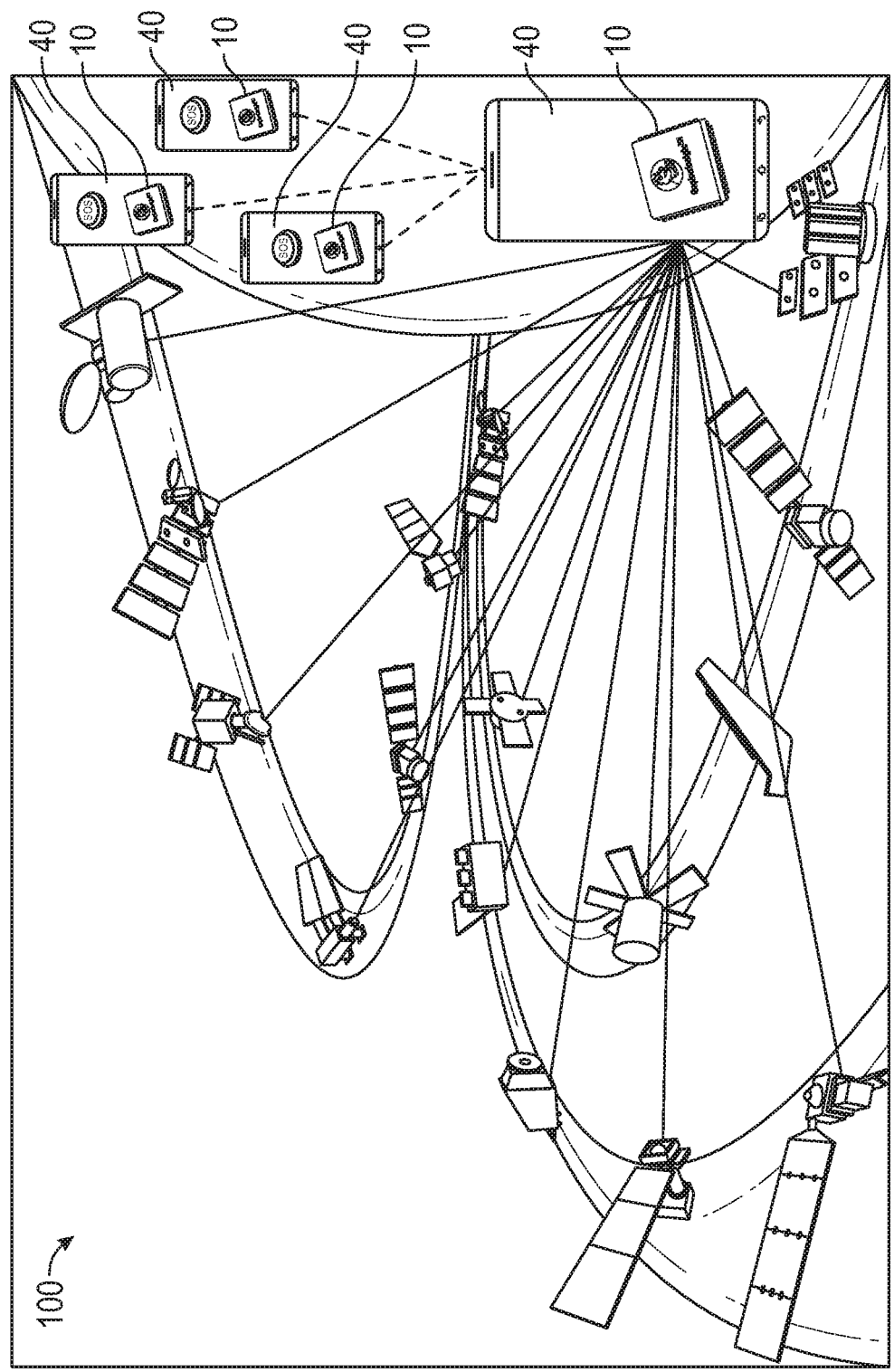
FIG. 2 is a perspective view of an exemplary embodiment of a communications system in accordance with the present disclosure.
Figure 3:
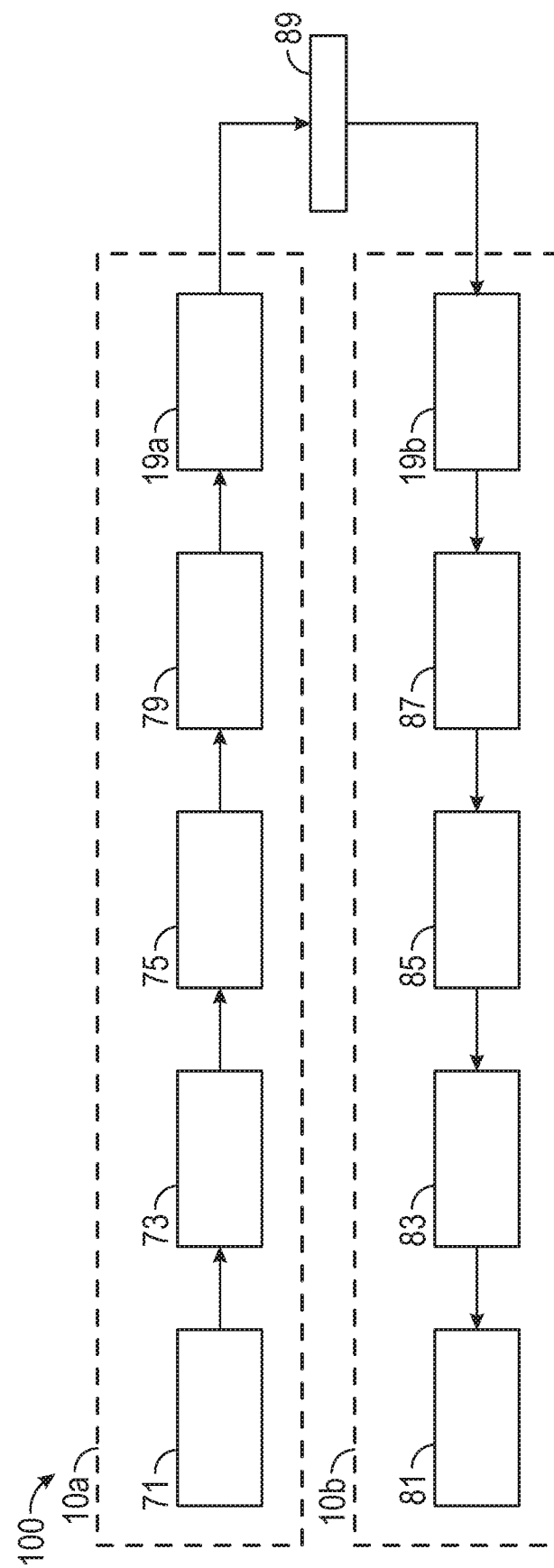
FIG. 3 is a schematic of an exemplary embodiment of a communications system in accordance with the present disclosure.

Turning to FIGS. 2 and 3, in exemplary embodiments an electronic circuit 10 forms an integral part of a communications system 100 comprising one or more personal computing devices 40. In exemplary systems, each personal computing device 40 houses an electronic circuit 10. More particularly, the electronic circuit or microchip 10 can be embedded within a mobile device's existing microchip or installed within a mobile device's electronic board, as an integral part of the system, and be configured to operate as a specific purpose electronic circuit or microchip. Alternatively, the electronic circuit or microchip 10 could be part of a complete, independent computer system within a mobile device. The personal computing device 40 could be one or more of a personal computer, a smartphone, a tablet computer, a PDM, a server, a cloud server array, a blade, a cluster, a supercomputer, a supercomputer array, and a game machine, and/or any other device with computing functionality. In FIG. 2, satellite communications are represented by solid lines and electronic circuit communications by dashed lines.

As shown in FIG. 3, a sender circuit 10a sends signals to a receiver circuit 10b via channel 89. The sub-blocks in the sender circuit 10a may include a source 71, a source encoder 73, a channel encoder 75, a modulator 77, and a transmitter antenna 19a. The sub-blocks in the receiver circuit 10b may include a destination 81, a source decoder 83, a channel decoder 85, a detector/modulator 87, and a receiver antenna 19b. In exemplary embodiments, the electronic circuit 10 works in conjunction with a smartphone software application. Field programmable gate arrays and other specific circuitry can be used to create and maintain a private, secured and encrypted network to provide analysis and heuristic based logic to work in conjunction with the mobile software application, enabling a powerful mechanism to provide personal assistance to users.

In exemplary embodiments, the electronic circuit or microchip 10 may also work with other electronic circuits and microchips, embedded within mobile devices, via private, encrypted, secured communication protocol, worldwide. More particularly, the electronic circuit and/or microchip 10 is connected to another electronic circuit and/or microchip 10, the connection between computers being made with the same hardware-based access barriers or firewalls including potentially any of the buses and on/off switches described herein in order to ensure private, secured and encrypted network, worldwide. This advantageously results in a private, secured, encrypted communication protocol established with all existing electronic circuits or microchips embedded within mobile devices, worldwide, creating a powerful computing system providing a wide variety of user benefits.

A secure control bus may be configured to work with the same electronic circuit or microchip 10 within other mobile devices, via the secured, private network. More particularly, the secure control bus may be configured to provide a connection to control at least a second firewall located on the periphery of the electronic circuit or microchip 10. In exemplary embodiments, the hardware-based access barriers or firewalls are used successively between an outer private unit, an intermediate more private unit, and an innermost private unit, and the public unit (or units), with each private unit potentially being configured for a connection to a separate private network.

In exemplary embodiments, the electronic circuit or microchip 10 is configured to be securely controlled through a private network of computers. A secure control bus may be configured to connect a master controlling device with the public microprocessor located in the unprotected public unit or units. More particularly, the secure control bus may be configured such that it cannot be affected, interfered with, altered, read from or written to, or superseded by any part of said unprotected public unit or by input from the public network. The secure control bus is, however, able to receive input from the master controlling device, and the master controlling device provides secure control via the secure control bus.

In exemplary embodiments, the master controlling device controls the private unit or units through the private network of computers by the additional and separate private network connection in the secure private unit or units and via the secure control bus. More particularly, the secure control bus may provide and ensure direct preemptive control by the master controlling device over the private microprocessor, core or processing unit. A secondary controller may also be used to control the private unit. In addition, the master controlling device may be configured to securely control the operations of the public microprocessor. In exemplary embodiments, one or more secondary controllers may be used to control the public microprocessor located in the unprotected public unit. The secondary controllers may be integrated with or located in the public microprocessor in the public unit. The electronic circuit 10 may also have an energy storage unit on it. In exemplary embodiments, the energy storage unit is a metal capacitor, though any type of energy storage unit could be used. As discussed in detail herein, the capacitor can store power for an SoS beacon pulse as part of emergency communications system 300.

Advantageously, exemplary systems incorporating disclosed electronic circuits can provide a wide variety of functions. For example, in exemplary embodiments a self-diagnostic system is provided to forecast and detect possible internal malfunction of the electronic circuit and other parts of the personal computing device and warn the user of the malfunction. The self-diagnostic system could automatically switch to a redundant system to avoid cessation of operations of the device. By the same token, exemplary embodiments have a power disconnect feature to disconnect the power supplies to the microprocessor or other parts of the device, causing the entire personal computing device to permanently cease operations.

It should be noted that the electronic circuit 10 and communications system 100 described above, with some or all of their components and connections, can be employed in a number of systems and applications described herein. These include, but are not limited to, a remote disablement system 200, an emergency communications system 300, a communications and delivery system 400, a communications and on-demand fueling system, a communications and on-demand trucking system, and an altitude detection and airplane mode activation system 700.

Turning to FIGS. 4-9, a remote disablement system will now be described. In exemplary embodiments, a remote disablement system 200 is communicatively connected to the electronic circuit 10 and is configured to disable the electronic circuit 10. As discussed above, the electronic circuit 10 may be embedded within a personal computing device's 40 existing microchip as an integral part of the system and configured to operate as a specific purpose electronic circuit or microchip, or it may be installed within the device's electronic board. As described in detail herein, the remote disablement system 200 provides an administrator with control over the electronic circuits 10 to remotely fully disable or partially disable and/or re-enable or permanently damage one or more mobile devices including smartphones, tablets, mobile computers and PDMs according to a device's functionalities and/or the user's desires in order to protect the user's privacy and private data exposure. In exemplary embodiments, the electronic circuit 10 is included inside one or more of a personal computer, a smartphone, a tablet computer, a PDM, a server, a cloud server array, a blade, a cluster, a supercomputer, a supercomputer array, laptop computer, and/or a game machine.

Figure 4:
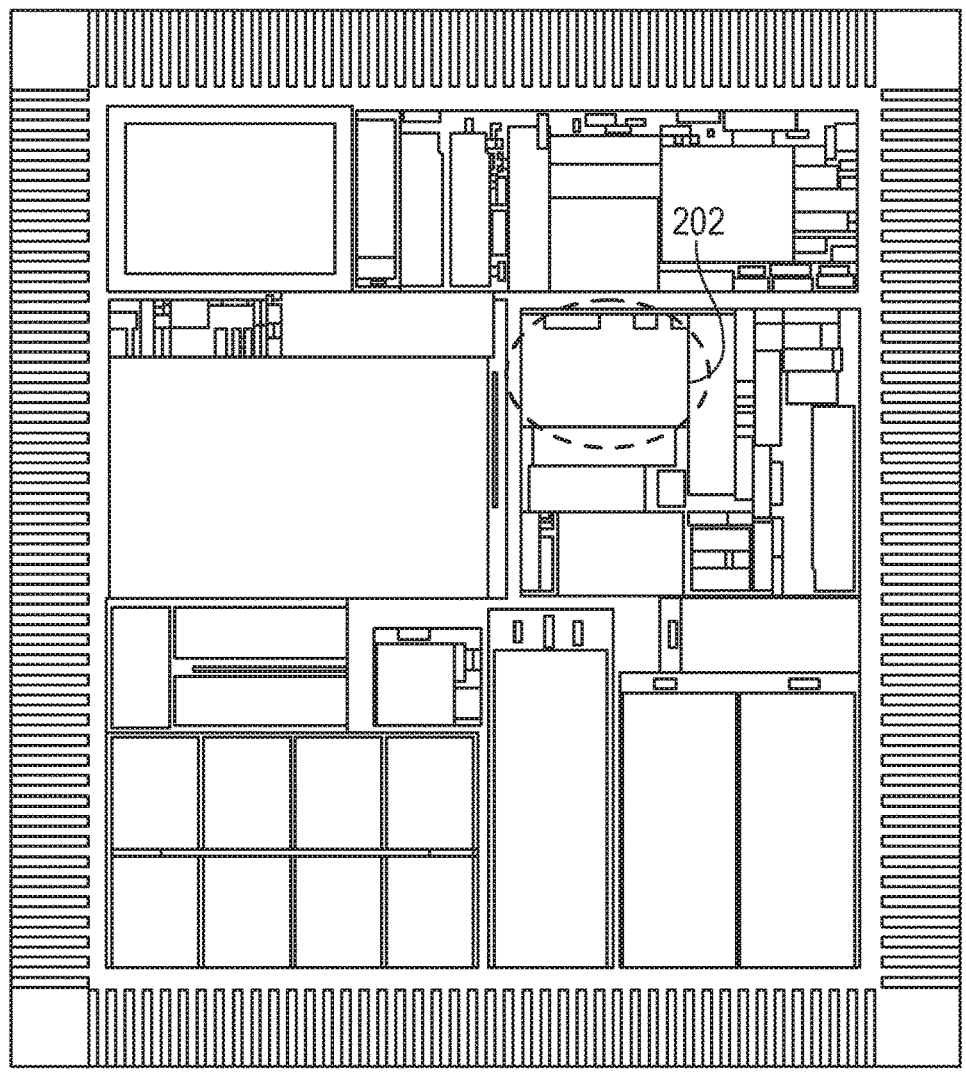
FIG. 4 is a schematic of an exemplary embodiment of an electronic circuit in accordance with the present disclosure.
Figure 5:
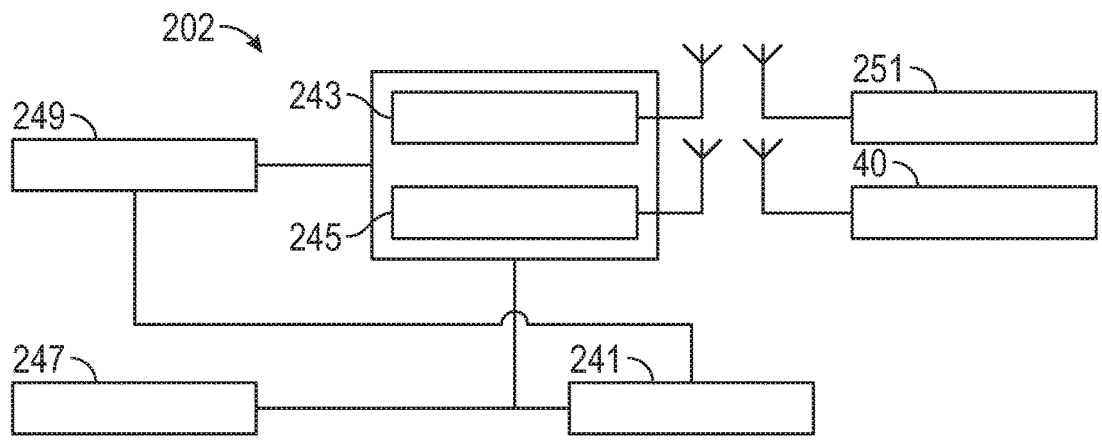
FIG. 5 is a schematic of an exemplary embodiment of a remote disablement unit in accordance with the present disclosure.
Figure 8:
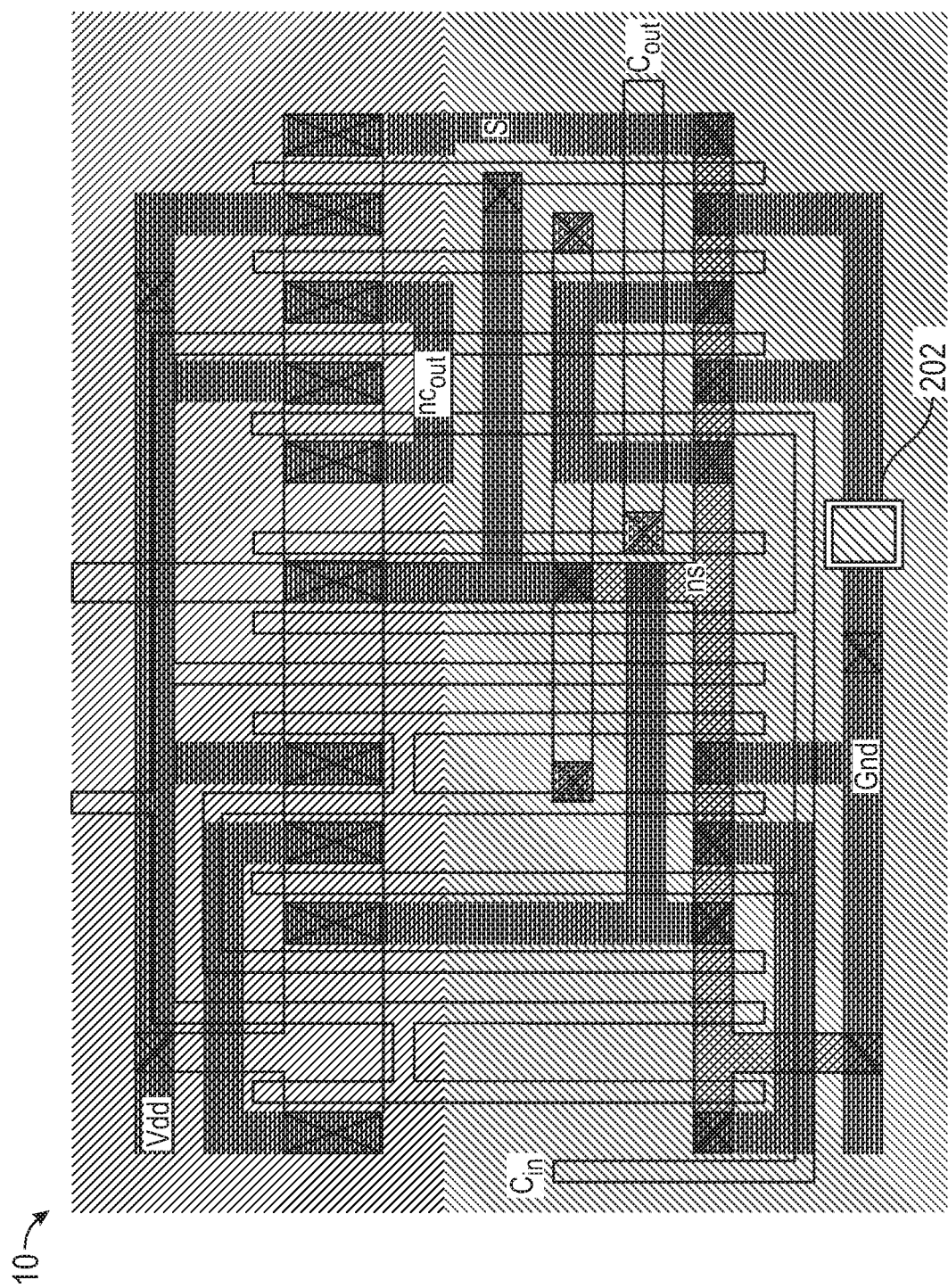
FIG. 8 is a schematic of an exemplary embodiment of an electronic circuit in accordance with the present disclosure.

Generally, the remote disablement and/or re-enablement can be accomplished via hardware and software instructions. As seen in FIGS. 4, 5 and 8, the electronic circuit 10 may include a disabling unit 202. The hardware and software may be installed and operate on personal computing devices 40 and connect to another computer program that runs on a separate server via a secured, encrypted, private communication protocol. An exemplary disabling unit 202 is connected to the send and receive units and receives an encrypted, proprietary sequence of codes. The disabling unit 202 may include a power source 241, a gateway 243 and a transceiver 245 for signal transmission, a disablement subunit 247, and other device circuitry 249. Upon matched combination, the disabling unit 202 disables the mobile device 40. Since the system continues its operation within the microchip, it can receive another codes sequence and re-enable the mobile device operation.

Figure 6:
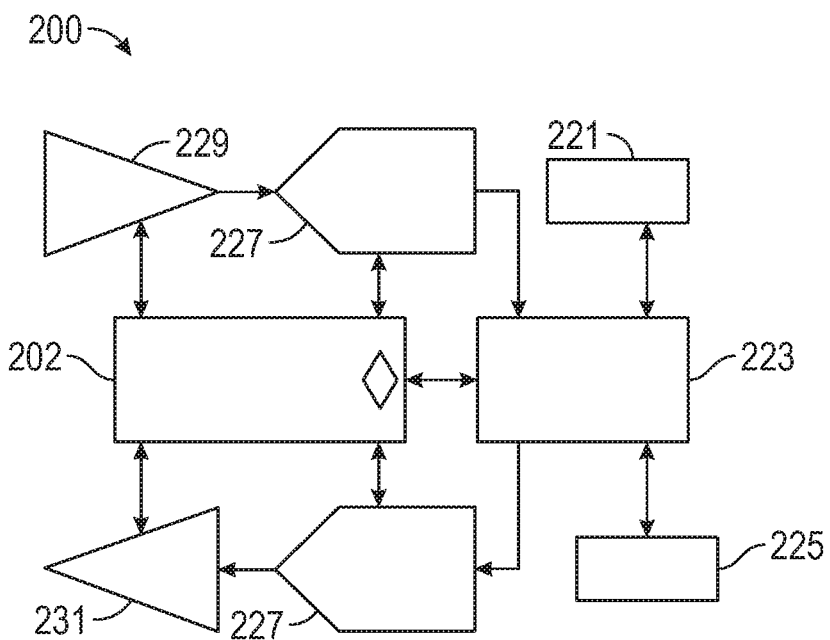
FIG. 6 is a schematic of an exemplary embodiment of a remote disablement system in accordance with the present disclosure.
Figure 7:
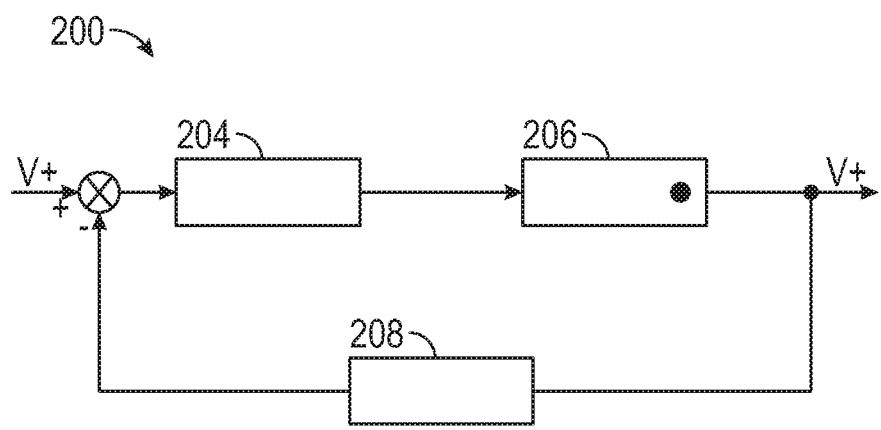
FIG. 7 is a schematic of an exemplary embodiment of a remote disablement system in accordance with the present disclosure.

In exemplary embodiments, illustrated in FIGS. 6 and 7, the remote disablement system 200 includes a hardware controlling device 204 in communication with the electronic circuit 10. The hardware controlling device 204 may be located in the personal computing device 40 or located remotely. The system 200 may include a logic circuit 221, an embedded processing unit 223, an interface 225, one or more data converters 227, communications in 229 and out 231, and the disabling unit 202. The hardware controlling device 204 may comprise a microcontroller, core or processing unit, mobile software, and a memory unit configured for the remote disablement function. The hardware controlling device 204 may include a RAM and/or ROM memory and, through processor 206, provide feedback 208 to the controller 204. Alternatively, the electronic circuit 10 may work in conjunction with mobile software to send disabling and/or re-enabling signals. As discussed above, the hardware and/or software works together via a secured, private encrypted, communication protocol. Communication between the mobile and external software and the electronic circuit and related circuitries via the cloud is also possible.

The disablement functionality works with the circuitry to enable full or partial personal computing device disablement control, according to functionalities, including mobile software applications. The disablement hardware and software can connect with other mobile devices that include the same microchip(s) and proprietary mobile software, worldwide, via a secured, encrypted protocol, creating powerful security/privacy control system for customer's benefits. The system may be secured and encrypted with 1024-bit encryption protocol to avoid data breach over the communication channels. In exemplary embodiments, the hardware and software may form a virtual machine based disablement system and method for remote disablement of a mobile device according to demand. Disclosed systems and methods advantageously provide admin usage in case of lost or stolen mobile devices or any other security based necessities determined, for example, by government law enforcement and national security. In these instances, the device can be remotely disabled and/or completely destroyed.

An exemplary remote disablement system 200 is configured to shut down an electronic unit via remote command. Advantageously, the system can disable the electronic circuit 10 and/or the entire personal computing device 40 via remote instruction. In exemplary embodiments, the system 200 disables the entire integrated circuit power, via remote command, and thereby causes permanent damage to the integrated circuit 10. In exemplary embodiments, the system 200 creates and sends a power spike into the electronic circuit 10 to permanently disable it or into the personal computing device's 40 motherboard and other microchips, causing permanent damage to the device 40 and disabling the entire device. A power disabling system 204, shown in FIG. 8, can disable the electronic circuit 10 by cutting the ground power to the circuitry.

Figure 9:
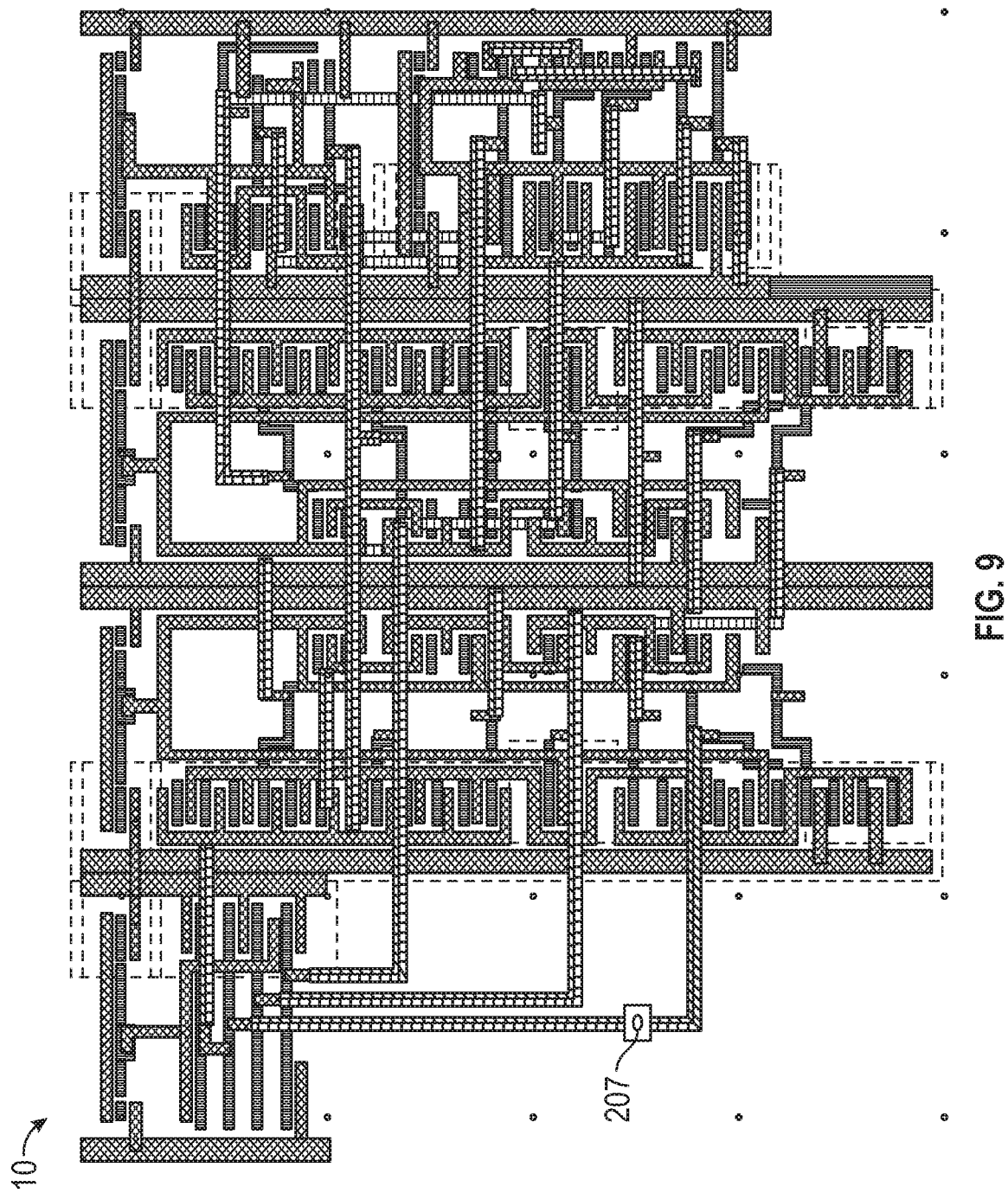
FIG. 9 is a schematic of an exemplary embodiment of an electronic circuit in accordance with the present disclosure.

The system 200 can provide more than one level of remote disablement such that only a specific unit or partial functionalities of a personal computing device 40 are disabled and/or the complete device is disabled. FIG. 9 illustrates a disabling unit 207 for a specific functionality circuit. The disabling unit 207 disables only part of the electronic circuit 10 by cutting off power to only the specific unit. In exemplary embodiments, the system 200 may include a selective feature disablement management feature configured to be able to remotely disable only certain specific features of a personal computing device 40. Advantageously, the functionalities and features to be disabled may be determined based upon online and offline functionalities and features, taking into account the admin's priorities and preferences and other relevant circumstances. The remote disablement levels or features can be determined by a heuristic based algorithm. The disablement algorithm may be supported by other electronic circuits within other personal computing devices 40. The system 200 may be configured to check the personal computing device 40 for user information and allow or deny access to online and offline activities for the main software application based on the disablement levels requirements.

In exemplary embodiments, a complementary device and user parts of a wireless communication device may permit the personal computing device 40 to function normally in the presence of an authorized user. In such instances, the system 200 communicates within a defined operation envelope defining a permissible working relationship and communication link for authorizing normal functioning of the personal computing device 40. The system may be configured to respond to interruption of the communications link with the personal computing device 40 by inhibiting the device from normal functioning. The interruption of the link could be measured in time or distance to permit a separation to be established between the admin and the mobile device. Thus, advantageously, if the mobile device is forcibly taken from the authorized user and the user's safety and privacy jeopardized, the mobile device can be remotely disabled.

To maintain security, the disablement algorithm may communicate with its supporting circuits and external software over a secured, encrypted, private communication protocol. In exemplary embodiments, the remote disablement algorithm is connected via its private, secured, encrypted protocol with all supported microchips that exist on mobile devices, worldwide. In exemplary embodiments, a fraction of a second before the personal computing device 40 is disabled or shut off, the electronic circuit 10 sends a last pulse indicating the latitude and longitude of the device.

In exemplary embodiments, the system includes a virtual machine management unit 251 in communication with the personal computing device 40. The virtual machine management unit is configured to transmit a set of instructions to the electronic circuit 10 to permanently cease its operation. More particularly, the system prompts the personal computing device 40 to send a secured, encrypted, private code sequence to the electronic circuit 10 in order to deactivate the device 40, the integrated circuit 10, or the device's motherboard. This may be accomplished via specialized software executed on the personal computing device 40 such as a smartphone software application. In exemplary embodiments, the mobile software sends the secure code to start the remote disablement sequence in the personal computing device 40. The system 200 may include an option to erase the personal computing device's 40 memory prior to its permanent deactivation or independent of the deactivation. Working with the software, the system 200 may remotely monitor the activities of the personal computing device 40.

In exemplary embodiments, after disabling a personal computing device 40, the system 200 can re-enable the device. In an embodiment, the system re-enables the electronic circuit's 10 power and therefore restores the circuit's full operation as well as the entire device's operation. In addition, the system 200 can re-enable the proprietary microchip by sending a command sequence and therefore restoring the personal computing device 40 to full operation. In exemplary embodiments, the system 200 includes circuitry to disable and re-enable the device's operation numerous times.

Figure 10:
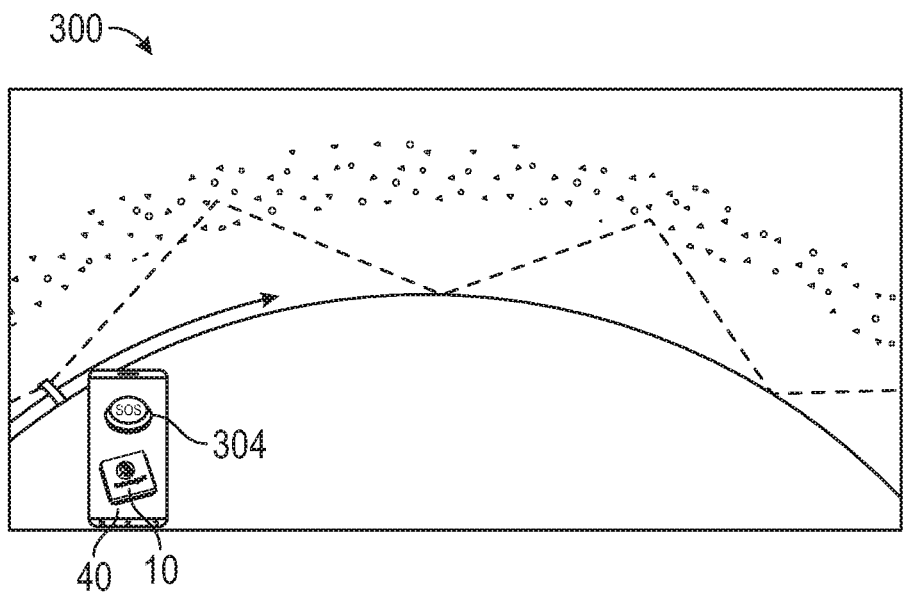
FIG. 10 is a schematic of an exemplary embodiment of an emergency communications system in accordance with the present disclosure.
Figure 11:
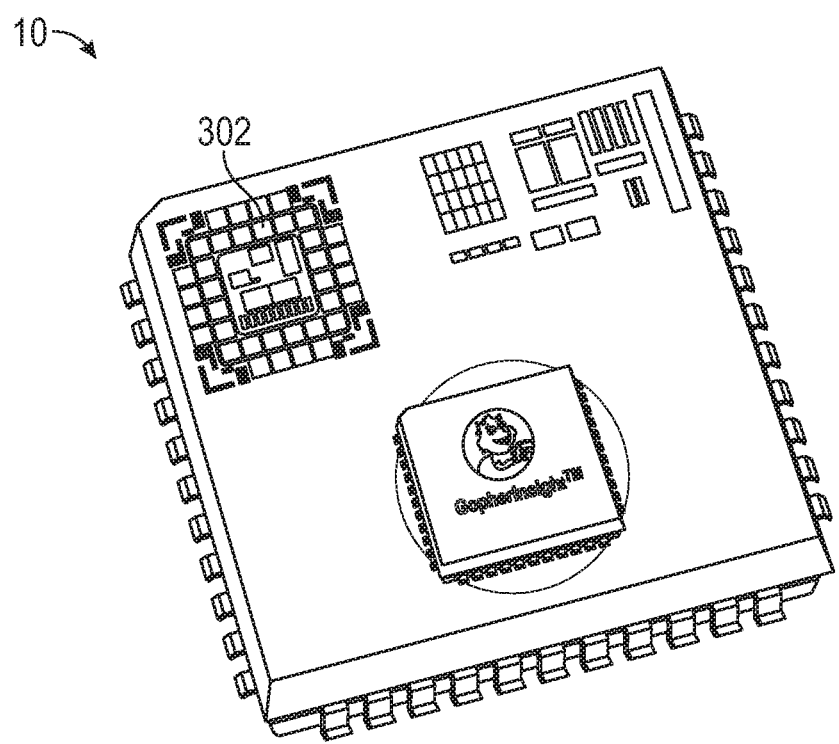
FIG. 11 is a schematic of an exemplary embodiment of an electronic circuit in accordance with the present disclosure.

Turning to FIGS. 10-13, an emergency communications system will now be described. In exemplary embodiments, an emergency communications system 300 is communicatively connected to the electronic circuit 10. The electronic circuit 10 may be embedded within an existing microchip of a personal computing device 40 or within the electronic board as an integral part of a communications system and configured to operate as a specific purpose electronic circuit or microchip. As best seen in FIG. 11, an emergency unit 302 may be located on the electronic circuit 10.

The emergency communications system 300 may comprise systems, methods and computer software for purposes of emergency communication, beacon, location identification, tracking, and transmission of a user's medical vital signs status on personal computing devices, in real time. As shown in FIG. 10, in exemplary embodiments the system 300 tracks and identifies the location of each personal computing device 40 in the system, including its location, status and global position in any type of terrain and landscape, world-wide.

During ordinary operation, the emergency communications system 300 may communicate within a defined operation envelope defining a permissible working relationship and communication link for authorizing normal functioning of the personal computing device 40. The system 300 responds to interruption of the communications link with the personal computing device 40 inhibited from normal functioning, as measured in time, distance or malfunction, and continues the emergency transmission using the electronic circuit's circuitry, via satellite or short waves. The system 300 can identify mobile device malfunction and continue emergency satellite transmission using the electronic circuit and/or a capacitor power unit, as described herein. It should be noted that the emergency communications system could also have remote disablement features as described above and could also incorporate a remote disablement system 200.

Signals can be sent over personal computing devices using electronic circuits 10 and a mobile software application that work in conjunction to identify the location of the personal computing device 40, which could include a personal computer, a smartphone, a tablet computer, a PDM, a server, a cloud server array, a blade, a cluster, a supercomputer, a supercomputer array, and a game machine, and/or any other device with computing functionality. The emergency communications systems 300 may be configured to determine the best, shortest route to reach the user/trackee using a combination of tracking points and display the determined route on the graphical user interface associated with the user's personal computing device 40.

In exemplary embodiments, the emergency communications system 300 records users' personal information including medical data. More particularly, the system 300 records personal identification features such as the user's fingerprint and eye print. The user can enter his/her medical information and the system 300 is configured to transmit vital signs status in real time to a central emergency server. The system may measure the user's vital data using the mobile device health sensor and/or via the application software. In these instances, the user's medical information and vital signs status may be transmitted to a remote center for assessment by one or more medical professionals.

The emergency communications system 300 enables GPS based emergency communication and location tracking. More particularly, the system 300 enables tracking of the user's personal computing device 40 via a unique sequence code that is assembled within the electronic circuit 10. The system may communicate directly with a satellite network and can work in areas that are out of cellular/wireless range. In exemplary embodiments, the system 300 includes an SOS button 304. When the SOS button is activated, an emergency sequence for location and tracking is activated and launched.

The emergency sequence may include transmission of a private emergency signal, in the form of an encrypted, secure private code sequence (e.g., 1024-bit encryption protocol) to avoid data breach, to the electronic circuits 10 of other personal computing devices 40 in the area and to the central emergency server every designated time period. The code starts the emergency procedure. In addition, the code may identify the location of the personal computing device 40. The transmission may be done via GPS system and/or via the proprietary microchip protocol.

In exemplary embodiments, a distress signal is transmitted to other electronic circuits 10 within other personal computing devices 40, worldwide, to increase its power and transfer to the main emergency server in a central location. In exemplary embodiments, the system identifies the mobile device location (latitude and longitude), and, as best seen in FIG. 10, transmits this information via sky waves (represented by dashed lines), and/or even through the ionosphere (represented by the layer of various shapes) to be received by other electronic circuits 10. The closest electronic circuit 10 that receives the information passes it on through regular network ground waves (represented by the solid line and arrow), such as the internet. In this way, a mobile user can be located worldwide, without any cellular/internet services. In exemplary embodiments, the signals can be monitored worldwide and the location of the distress detected by non-geostationary satellites. The user can be located by some combination of GPS trilateration and Doppler triangulation.

Figure 12:
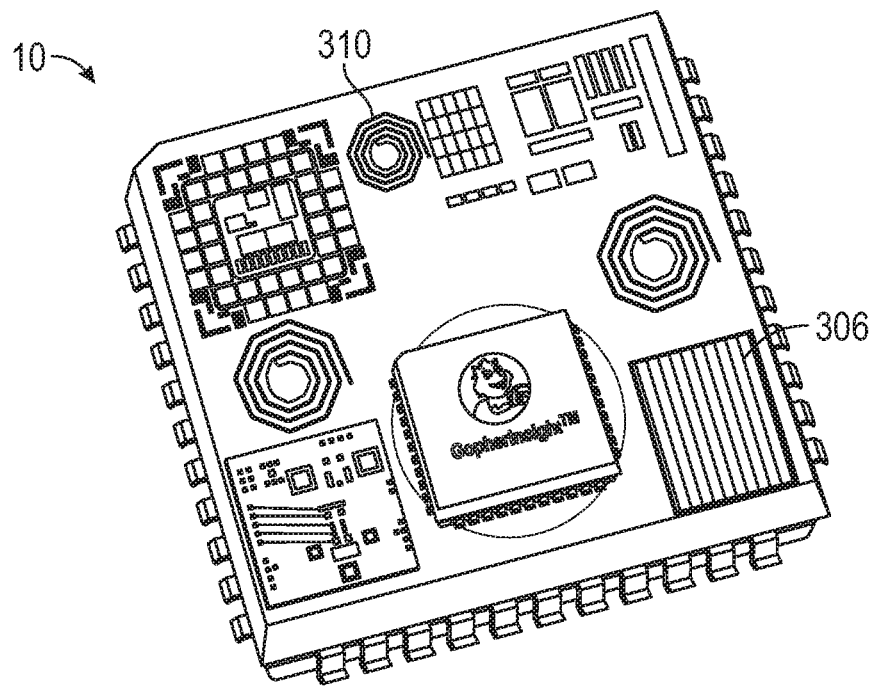
FIG. 12 is a schematic of an exemplary embodiment of an electronic circuit in accordance with the present disclosure.

As the emergency procedure starts, the system 300 may put the user's personal computing device 40 on power saving mode to maximize battery life. In exemplary embodiments, the system switches to proprietary lowest power consumption mode upon SOS button activation. In addition, as best seen in FIG. 12, the emergency communications system may have a capacitor 306 that is within the electronic circuit 10 and the capacitor may hold energy for extra use after the battery power is exhausted. The system 300 may disable the majority of the personal computing device 40, keeping only the necessary features, or may disable the entire device. From that moment on, the emergency communications system 300 controls every power related operation within the personal computing device 40.

In exemplary embodiments, the emergency communications system 300 detects battery exhaustion time and provides certain operations accordingly. For example, within a certain time period before the battery power runs out, the system 300 transmits the last location of the user's personal computing device 40 and a forecasted location in the next few hours, based on the movement that was done for the past few hours. Thus, the system may send a last GPS location signal to other electronic circuits 10 to be transferred to the central emergency server. When the personal computing device 40 is being shut off for any reason, including when the battery is dying, a fraction of a second before shut off the electronic circuit 10 sends a last pulse containing the latitude and longitude information of the device. It can also transmit the latitude and longitude during each SoS interval that can last for a few days. The system also may offer a text messaging feature during low battery period so the user can communicate via text with an emergency control center, a rescue team, or other rescue services.

Figure 13:
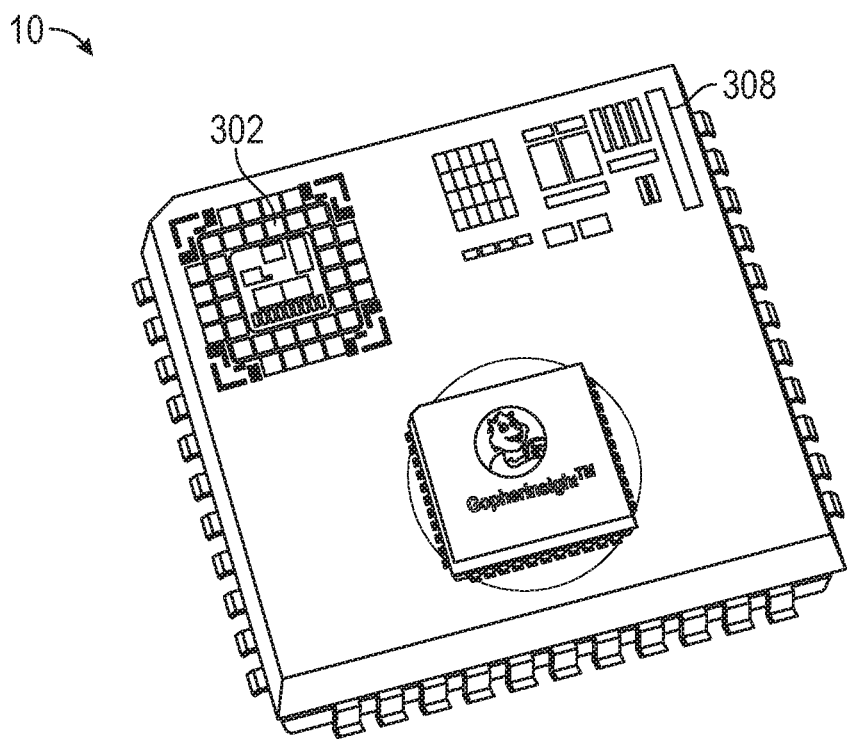
FIG. 13 is a schematic of an exemplary embodiment of an electronic circuit in accordance with the present disclosure.

With reference to FIG. 13, the system 300 may also include a short wave transceiver unit 308 located on the electronic circuit 10. In exemplary embodiments, the system may trigger a short wave transmitter to transmit for longer time short wave radio signals. These signals are targeted to emergency receivers worldwide. In exemplary embodiments, the system 300 has a self-adjustment short wave adjustment system to adjust the short wave transmission, achieving maximum efficiency, during terrain change and/or battery life condition. The transmitter is activated when the battery's energy is completely drained.

The high frequency RF circuitry, including an RF antenna 310 on the electronic circuit 10, as shown in FIG. 12, is designed to operate for few more days using the metal capacitor's energy. More particularly, the electronic circuit 10 continues to transmit short wave pulses after the main battery power is exhausted, providing a few more days of GPS location identification transmission. In addition, based on the battery power remaining, the system may adjust the emergency transmission pulse, creating longer intervals, in order to extend the emergency transmission time. In exemplary embodiments, the frequencies of the short wave signals are automatically adjusted by the electronic circuit to be in the range of few to hundreds Megahertz, according to the topographic and landscape in order to reach longer distances.

As mentioned above, the capacitor 306 stores power to enable an SoS beacon pulse every few minutes for a few days or up to about a week of emergency beacon, even after the battery in the personal computing device 40 is exhausted. In exemplary embodiments, each pulse contains latitude and longitude information of the device 40, user name, phone ID and additional information about the user's condition. It should be noted, however, that the capacitor does not kick into work only after the battery is dead. As the battery is still live the user can enter his medical condition and status via text. This text can be coded and transmitted with the other information in the pulse mentioned above. The advantageous result is a beacon pulse that is transmitted every few minutes about the location and status of the user. Once this pulse reaches other electronic circuits 10 on other personal computing devices 40, it transfers the emergency signal through a regular network, between the electronic circuits 10. The phone company/users will receive an alert about an emergency condition akin to amber alerts.

Figure 14:
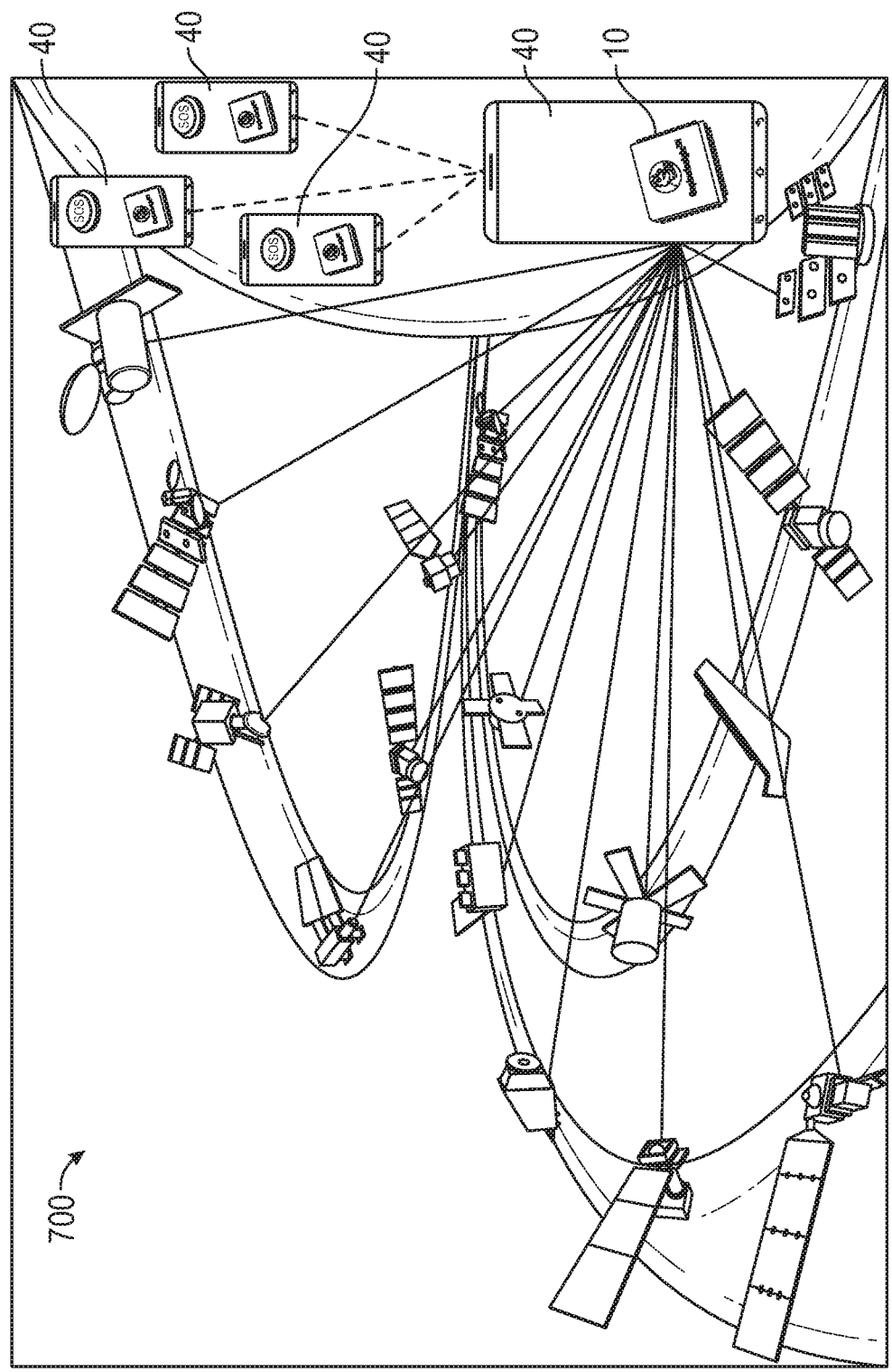
FIG. 14 is a perspective view of an exemplary embodiment of an altitude detection and airplane mode activation system in accordance with the present disclosure.
Figure 15:
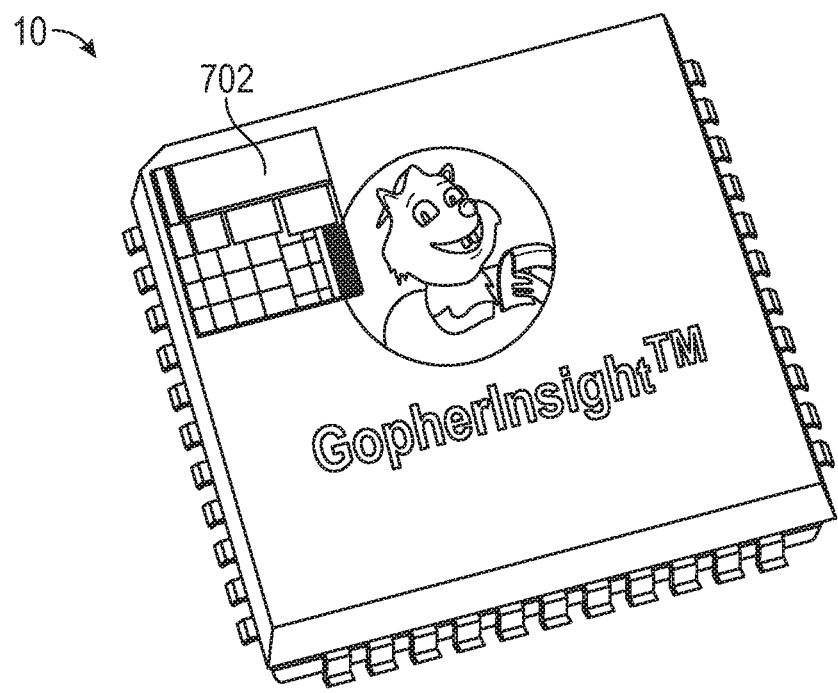
FIG. 15 is a perspective view of an exemplary embodiment of an electronic circuit in accordance with the present disclosure.

FIGS. 14-17 illustrate exemplary embodiments of an altitude detection and airplane mode activation system 700. More particularly, exemplary systems can automatically detect the altitude and motion activity of a personal computing device 40 and, based on the altitude information, can automatically activate and/or deactivate airplane mode on the personal computing device. An altitude detection and airplane mode activation system 700 may employ the electronic circuit 10 containing an auto airplane mode circuit 702, best seen in FIG. 15, and other components and features of the communications system 100 described above. In FIG. 14, satellite communications are represented by solid lines and electronic circuit communications by dashed lines.

Figure 16:
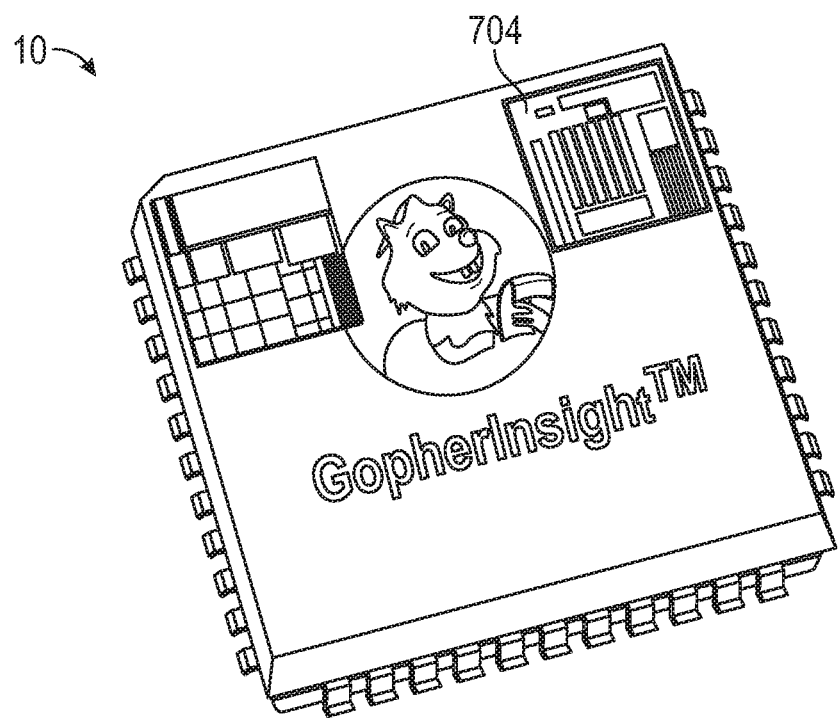
FIG. 16 is a perspective view of an exemplary embodiment of an electronic circuit in accordance with the present disclosure.

The electronic circuit 10 may be embedded within an existing microchip of a personal computing device 40 or within the electronic board as an integral part of a communications system and configured to operate as a specific purpose electronic circuit or microchip. The system 700 may include a short wave transceiver 704 used in conjunction with the electronic circuit 10 to detect location, altitude, and motion activities of the personal computing device 40. As best seen in FIG. 16, a self-adjustment short wave monitor system including a short wave unit 704 may be provided to adjust the short wave transmitting, achieving maximum efficiency, during terrain change and/or battery life condition.

The personal computing device 40 could include a personal computer, a smartphone, a tablet computer, a PDM, a server, a cloud server array, a blade, a cluster, a supercomputer, a supercomputer array, and a game machine, and/or any other device with computing functionality, including Apple and Android platforms by, e.g., smartphone app. Exemplary systems 700 are based on hardware and software installed and operated on personal computing devices and connecting to the cloud and/or to an external computer program that runs on a separated server via a secured, encrypted, private communication protocol (e.g., 1024-bit protocol) to avoid data security breaches. The system 700 works with or without cellular services and transmits signals to and receives signals from satellites or short wave pulses via a private, secured, encrypted channel to communicate the motion status of the personal computing device 40.

Figure 17:
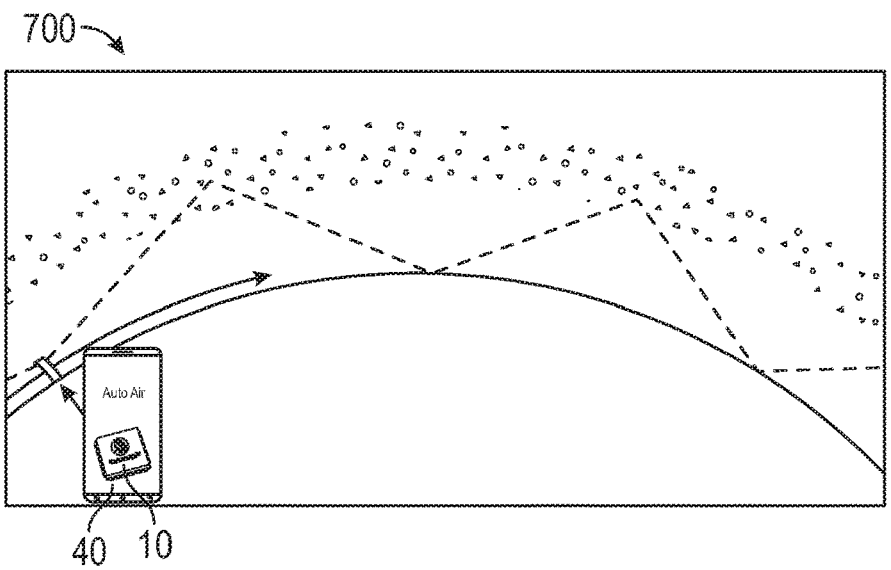
FIG. 17 is a perspective view of an exemplary embodiment of an altitude detection and airplane mode activation system in accordance with the present disclosure.

With reference to FIG. 17, the altitude detection and airplane mode activation system 700 utilizes private, encrypted, secured signals to communicate with satellites or short waves to identify the personal computing device's location, altitude and motion activities. More particularly, the mobile software executed on the personal computing device 40 communicates via a secured, encrypted, private code sequence with the electronic circuit 10 to activate the designated circuitry for the personal computing device's altitude and motion activity identification and activation/deactivation. These signals may comprise dynamic pulses on a predefined order and frequency, in order to detect the altitude of the personal computing device 40. Upon personal computing device airborne status detection, the system 700 automatically switches the personal computing device into airplane mode. In exemplary embodiments, the system 700 has a safe text messaging feature that enables direct text messaging with other users, enabling the user's communication in airplane mode. On the other hand, once the system 700 identifies that the mobile device is on the ground it automatically deactivates airplane mode and switches to normal operation mode so the personal computing device 40 resumes its normal operation. In FIG. 17, sky waves are represented by dashed lines, ground waves by a solid line with an arrow, and the ionosphere by the layer of various shapes.

In exemplary embodiments, the system 700 transmits through a private, secured, encrypted communication channel in designated time frames an encrypted, secured signal to all other personal computing devices in the area and to a main server. The transmission may be done via GPS system, short wave unit 704 that is on the electronic circuit 10 and/or via the proprietary microchip protocol. Thus, exemplary embodiments provide techniques and configurations used for location, altitude and motion activities identification and automatic activation or deactivation of airplane mode, operated on mobile devices in order to maintain FAA regulations and flight safety.

In operation, an exemplary altitude detection and airplane mode activation system 700 identifies the altitude, motion activity, or both of a personal computing device 40. The system uses electronic circuits 10 described above and mobile software application to automatically detect the altitude of the personal computing device 40 and activate or deactivate its airplane mode. More particularly, the system 700 identifies the personal computing device's 40 altitude and motion activity using electronic circuitry that is working in conjunction with the proprietary mobile software application and/or outside servers or the cloud and automatically switches to airplane mode when the personal computing device 40 becomes airborne. Alternatively, upon detecting that the personal computing device is airborne, the systems may display that data on a screen of the device to alert the user without, or prior to, switching to airplane mode. In exemplary embodiments, the system 700 constantly checks the mobile device altitude and motion activities by sending encrypted code sequences to satellites in order to locate the mobile device altitude. The system 700 also automatically deactivates airplane mode when the personal computing device 40 is on the ground level.

In exemplary embodiments, the system 700 enables or disables other personal computing device 40 functionalities according to its altitude and motion activities. The system 700 can also detect when the personal computing device 40 is on an aircraft or has entered into an aircraft's cabin and automatically switches into airplane mode. The system uses direct communication with satellites and radio frequency waves to determine the mobile device altitude and motion activities and to enable or disable the mobile device's functionalities. The system's short wave signals frequencies can be automatically adjusted by the electronic circuit to be in the range of few to hundreds Megahertz, according to the topographic and landscape in order to reach longer distances.

As shown in FIGS. 14 and 17, the electronic circuit 10 may directly communicate via satellite with all other electronic circuits 10 within personal computing devices 40, worldwide, in order to provide the necessary information to identify each personal computing device's 40 altitude and motion activities data and/or to share related data and data transfer to the main server in a central location. The system may be supported by the electronic circuits 10 in the other personal computing devices 40. The system 700 may transmit periodic identification signals every designated time, and by that identify the personal computing device's 40 location, altitude or motion activities. In exemplary embodiments, the system 700 works in conjunction with the emergency communications system 300 discussed above to provide alerts about the most recent location of the personal computing device 40.

During ordinary operation, the altitude detection and airplane mode activation system 700 may communicate within a defined operation envelope defining a permissible working relationship and communication link for authorizing normal functioning of the personal computing device 40. The system 700 responds to interruption of the communications link with the personal computing device 40 inhibited from normal functioning, as measured in time, distance or malfunction, and continues the emergency transmission using the electronic circuit's circuitry, via satellite or short waves. The system 700 identifies personal computing device circuitry partial failures and compensates to maintain airplane mode activation or deactivation for maximum safety. Transmission could also continue during a personal computing device 40 failure using the electronic circuit 10, short wave transmitter unit in order to identify altitude or motion activities. The system 700 can identify the device's airplane mode and continue emergency satellite transmission using the electronic circuit and/or a capacitor power unit and/or mobile application software.

Figure 18:
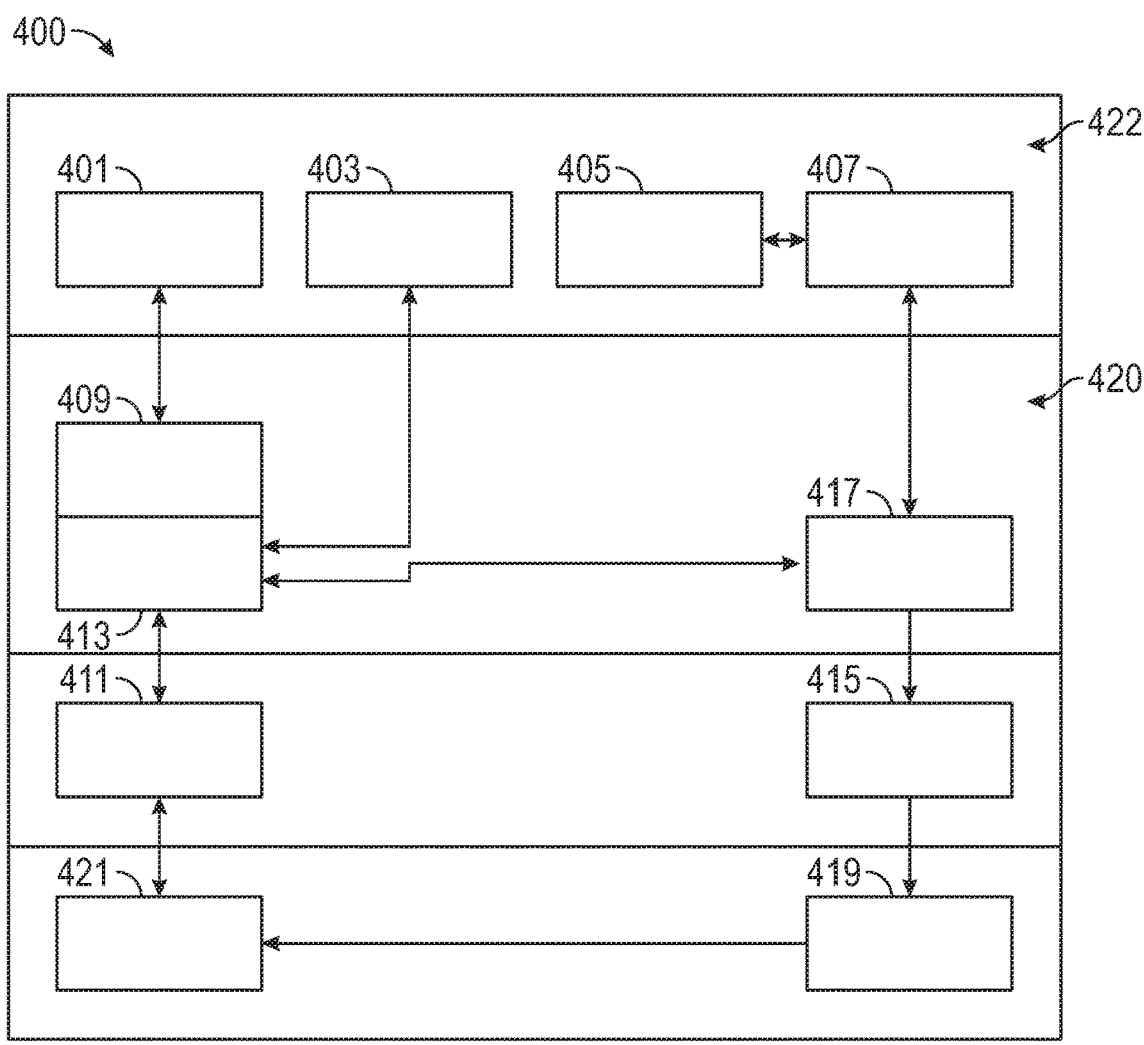
FIG. 18 is a schematic of an exemplary embodiment of a system and method of scheduling categorized delivery and/or service in accordance with the present disclosure.

With reference to FIG. 18, exemplary embodiments of systems and methods of scheduling categorized delivery and/or service according to customer demand are provided. A communications and delivery system 400 may employ the electronic circuit 10 and other components and features of the communications system 100 described above. In exemplary communications and delivery systems 400, the electronic circuit 10 provides heuristic based circuitry to support a categorized delivery and service application. More particularly, the circuit 10 and system 100 hardware supports a mobile software system and method for scheduling an on-demand delivery and/or service, to the customer's location of via mobile device and/or web based software application. Elements of the emergency communications system 300 describe above, such as GPS location and tracking services, enable identification of suppliers and products and delivery to a customer's location or any other location using the user's personal computing device 40 and/or an internet web site.

Exemplary communications and delivery systems 400 provide a categorized delivery and/or service to the customer's location of choice. Customers are able to request an item delivery or service to their location or to another location of the customer's choice, according to category, in real time or per scheduled appointment. The request can be made via a smartphone or other personal computing device 40, through a web site dashboard and control panel software and cellular phone messaging system or a phone call. The item can be a package containing any type of product, or could be a service. For example, a service could be a taxi or a notary. After the request is made the system locates available transporter/service providers according to the desired category on the network and dispatches one of the providers to the customer's location, for example, via a smartphone application. The system can also be used to match transporters/service providers to routes.

Registered transporters and/or service providers are drivers 411 that are interested to provide the delivery and/or service to customers. Transporters/service providers register into their desired category 401 according the delivery and/or service type, and this information may be communicated to and/or stored in the system's recording layer 409. In this way, the system 400 creates a registered transporters network or fleet, nation-wide or worldwide, to accommodate categorized delivery and or service requests from any region. Transporters or service providers register with the communications and delivery system 400 via their personal computing devices 40, either through a web site control panel or other application. Worldwide operation and support could also be provided. In exemplary embodiments, the transporters/service providers pay a monthly fee for their subscription. Only registered subscribers will be available through the system and on the web based, GPS based map. Registered transporters or service providers could enter their personal or company details and payment methods, such as credit card and/or PayPal. The system could also facilitate cooperation between registered transporters/service providers and banks or credit card companies so the transporters/service providers could provide credit or other financing to its customers.

In exemplary embodiments, customers 415 can register for free by entering their data 405. Credit card details may be necessary to verify that the customer is above 18 years of age. Registered customers select a desired delivery or service category 401 and receive an updated smartphone and web site based map of all available transporters/service providers at a radius of 20 miles of their locations. The customer 415 can then select a transporter/service provider for the desired service or delivery. The system 400 maintains the category, progress, client data information, and administrative functions in the application space 422. In exemplary embodiments, the customer can also run a background check on a transporter/service provider or use other tools, such as reviews or feedback 419, to verify the credibility of the transporter/service provider. The feedback 419 may be communicated to the driver by the main application 421. Upon the customer's selection and the transporter/service provider's approval, the customer receives a confirmation notification from an administrator 407.

The transporter/service provider and the customer then exchange their contact information and may communicate independently about the delivery and/or service via a personal computing device 40. The method and details of payments for the delivery and/or service provider are to be concluded between the customer and the transporter/service provider. In exemplary embodiments, the transporter/service provider contacts the customer via "picking up" the order and they exchange the delivery and/or service payments details. Upon their mutual agreement, the transporter/service provider is dispatched to the customer's location to carry out the delivery or service request. The system 400 may notify the customer of the provider's ETA and show on the screen of the user's personal computing device 40 or web site GPS based map, the transporter's/service provider's progress 403 toward the customer's location including updating the ETA accordingly. The category 401 and/or progress 403 may be communicated to and from the driver 411 via the operational layer 413 of the system 400. The recording layer 409 and operational layer 413 may be located within the system's library space 420.

Payment can be done at the time of service, as agreed between the transporter/service provider and customer. In this way, the customer receives a delivery and/or service at his preferred location. The service is fast, efficient and comprehensive. Transporters and service providers are available nationwide to receive delivery or service requests according to zip code and location. The system 400 based on these conceptual requirements can be a combination of exact and fuzzy logic. Both forms of logic can be handled by a fuzzy logic application since exact matches can be coded as discrete values (instead of ranges) within such an application. The system 400 may provide a transporter/service provider rating system for the customer's convenience.

In exemplary embodiments, the communications and delivery system 400 comprises a service request module configured to obtain a service request and a service location from a customer. A posting module 403 allows a customer to place the service request. The posting module 403 may be accessible by smartphone, computer-based software, and/or web-based software. An identification module 404 is configured to locate service providers matching the customer's service request and service location. The identification module 404 then identifies an origin-destination pair comprising a matching service provider and customer. The system 400 also has a scheduling module 406 to schedule a service order for the customer at the service location.

In exemplary embodiments, a notification module automatically identifies a matching service provider based on availability, registration, and/or product or service category. In exemplary embodiments, the system 400 alerts the transporter/service provider about a delivery and/or service request in the region. A dispatch module dispatches the service provider to the service location. In exemplary embodiments, the system 400 automatically identifies the customer's location and dispatches a transporter/service provider to the desired location in order to provide the delivery or service. Advantageously, the service request and service order can be done automatically in real time.

The notification module automatically communicates to the customer an estimated arrival time of the service provider at the service location to fulfill the service order, as well as notification of the provider's progress based on GPS updated map and notification of actual arrival time. The system 400 may also have a tracking module to track the location and movement of the service provider. In exemplary embodiments, a payment module is included in the system, in some embodiments in the transaction module 417, to receive and facilitate payment for the service order. The service order may be for a delivery of a package containing any type of tangible item or product. Alternatively, the order may be for a particular kind of service.

In exemplary embodiments, the service order is for fueling. Thus, in an embodiment, fuel delivery could be one of the service orders of the communications and delivery system 400. Alternatively, one could think of embodiments in which a communications and on-demand fueling system is independently created employing the electronic circuit 10 and other components and features of the communications system 100 described above as well as the components of the communications and delivery system 400 such that a customer can obtain fueling at his or her location of choice.

An on-demand fueling system can include obtaining from a customer a service request identifying an origin-destination-pair (matching customer location with a provider in the area). The system automatically identifies the customer's location and dispatches a tanker operator to the desired location in order to provide the gasoline fill service. The system notifies the customers of the estimated time of service and payment method, as well as providing invoice upon completion of the transaction 417.

Thus, exemplary embodiments advantageously provide a private gasoline fill service at the customer's location of choice. Customers are able to schedule a gasoline fill service for their vehicle at their location, in real time or per scheduled appointment. The reservation can be made via a smartphone or other personal computing device 40, through a web site dashboard and control panel software and cellular phone messaging system or a phone call. The personal computing device 40 could include a personal computer, a smartphone, a tablet computer, a PDM, a server, a cloud server array, a blade, a cluster, a supercomputer, a supercomputer array, and a game machine, and/or any other device with computing functionality, including Apple and Android platforms by, e.g., smartphone app. After the reservation (with potentially the vehicle odometer read for future use as vehicle fuel log) is made, the system finds an available gasoline tank vehicle that belongs to the registered provider network or is doing business with the network and dispatches it to the customer's location.

In exemplary embodiments, the tanker vehicle operator contacts the customer via "picking up" the order. As in the communications and delivery system 400, the communications and on-demand fueling system may notify the customer of the tanker vehicle's ETA and show on the personal computing device screen the tanker's progress toward the location with ETA updates accordingly. Payment can be done at the time of service, pre-paid or at a later time by billing statement. In exemplary embodiments, the on-demand fueling system facilitates barters and exchanges instead of traditional payments. In this way, the customer receives a gasoline fill service at his preferred location, hassle free. The service is fast, efficient and comprehensive. The tanker operator's tanker vehicles are available nationwide to receive gasoline fill requests according to zip code and location.

The on-demand fueling system based on these conceptual requirements may be a combination of exact and fuzzy logic. The system can be used to match tanker operators to routes. Both forms of logic can be handled by a fuzzy logic application since exact matches can be coded as discrete values (instead of ranges) within such an application. In exemplary embodiments, the communications and on-demand fueling system comprises analogous components as the communications and delivery system 400.

In operation, the communications and on-demand fueling system receives reservations from vehicle owners/customers. The reservation criteria entered by the customer include a customer's location, service time constraint, number of vehicles to be serviced, potentially the reading of the vehicle's odometer and an agreed upon payment schedule required to reserve the gasoline fill service. Prospective customers can enter their preferred gasoline fill request details. The system can be used to create a gasoline log book for tax purposes, gasoline consumption by average, and other statistical or recordkeeping purposes. The system may post online at least a portion of the availability information relating to various gasoline fill services, and the payment schedule may be determined prior to the posting of the availability information. In exemplary embodiments, the payment schedule includes a cost per vehicle.

The system can then receive reservation offers from a plurality of independent service providers. In exemplary embodiments, each of the reservation offers includes an agreement to a specific location request and a predetermined payment schedule. The system then selects a number of the received reservation requests such that the selected requests collectively are consistent with the reservation criteria entered by identified customers/vehicle owners. The system then communicates reservation offers from one or more independent tanker vehicle operators (or independent passengers to tanker vehicle operators) to provide the gasoline fill service. The system automatically identifies the customer's location and available providers in the area.

As with the communications and delivery system 400, communications and on-demand fueling system facilitates registration of fuel order fill providers, creating a registered tanker network or fleet, nation-wide or worldwide, to accommodate fuel service requests from any region. Registered transporters or service providers could enter their personal or company details and payment methods, such as credit card and/or PayPal. The system could also facilitate cooperation between registered transporters/service providers and banks or credit card companies so the transporters/service providers could provide credit or other financing to its customers. Worldwide operation and support could also be provided.

In exemplary embodiments, the communications and on-demand fueling system receives any changes in the reservation criteria and communicates the changes to each of the independent customers associated with the order. After a customer and fueling provider agree to the terms of a fueling order, the system dispatches the tanker to the customer's or any other location and notifies the customer of the ETA as well as the actual arrival time of the gasoline fill service to the customer's vehicle. The system may notify the customer of the tanker's ETA and show on the screen of the user's personal computing device 40 or web site GPS based map, the tanker's progress toward the customer's location including updating the ETA accordingly. Upon completion of the gasoline fill, the system automatically provides an invoice to the customer.

In exemplary embodiments, the customer can read the mileage from the vehicle odometer at the time of the order fill and generate a detailed report that can serve as gasoline base report/log for IRS purposes, or for any other use, like gasoline analysis and comparison. The system could also include a Quick Charge option for electric vehicles or other alternative fueling and power including but not limited to hydrogen, battery replacement, and compressed air. In exemplary embodiments, the electrical Quick Charge option is based on an advanced dynamo system. The communications and on-demand fueling system may also provide the option to sell complementary motor vehicle products such as motor oil, cleaning solvents and the like. The complementary products could be delivered by a registered service operator.

In exemplary embodiments, the service order is for trucking service. Thus, in an embodiment, fuel delivery could be one of the service orders of the communications and delivery system 400. Alternatively, one could think of embodiments in which a communications and on-demand trucking system is independently created employing the electronic circuit 10 and other components and features of the communications system 100 described above as well as the components of the communications and delivery system 400 such that a customer can obtain trucking and cargo hauling service at his or her location of choice. In exemplary embodiments, the communications and on-demand trucking system comprises analogous components as the communications and delivery system 400.

Developments in technology, such as computers, satellite communication, and the internet, have contributed to many improvements within the industry, but no on-demand trucking service has been offered as yet. This kind of on-demand cargo or hauling service could be valuable in a number of industries. For example, trucks are very important to the construction industry, as dump trucks and portable concrete mixers are necessary to move the large amounts of rocks, dirt, concrete, and other building materials used in construction.

Exemplary embodiments of a communications and on-demand trucking system provide a private or commercial cargo shipment service at the customer's or any other location of choice. The system enables customers to schedule a cargo hauling/shipment service for their vehicle at their or any other desire location, in real time or by scheduled appointment. The reservation can be made via a smartphone or other personal computing device 40, through a web site dashboard and control panel software and cellular phone messaging system or a phone call. The personal computing device 40 could include a personal computer, a smartphone, a tablet computer, a PDM, a server, a cloud server array, a blade, a cluster, a supercomputer, a supercomputer array, and a game machine, or any other device with computing functionality, including Apple and Android platforms by, e.g., smartphone app.

The system may obtain from a customer a service request and automatically identify the customer's location. After the reservation (with potentially the vehicle odometer read for future use as a vehicle fuel log) is made, the system then identifies an origin-destination-pair (matching customer location with a provider in the area). More particularly, the system finds an available trucking provider that is in the vicinity of the service request and belongs to a registered provider network or is doing business with the network. The system then dispatches a truck operator to the customer's desired location in order to provide cargo hauling service. The system based on those conceptual requirements may be a combination of exact and fuzzy logic. The system can be used to match truck operators to routes. Both forms of logic can be handled by a fuzzy logic application since exact matches can be coded as discrete values (instead of ranges) within such an application.

In exemplary embodiments, the trucking service operator contacts the customer via "picking up" the order. As in the communications and delivery system 400, the communications and on-demand trucking system may notify the customer of the truck's ETA and show on the personal computing device screen the truck's progress toward the location with ETA updates accordingly. Payment can be done at the time of service, pre-paid or at a later time by billing statement, and the system may facilitate payment by credit card. In exemplary embodiments, the system facilitates barters and exchanges instead of traditional payments. In this way, the customer receives a cargo hauling service at his preferred location, hassle free. The service is fast, efficient and comprehensive. The truck operator's vehicles are available nationwide to receive cargo hauling requests according to zip code and location.

Upon receipt of a customer's cargo delivery request, the communications and on-demand trucking system will identify local truckers within a desired radius. The customer can fill in basic details about the cargo to be delivered. These details include but are not limited to number of pallets and/or boxes and total height/width and weight of the cargo to be hauled. In exemplary embodiments, the system offers to provide value estimation and cargo content. The cargo delivery request may immediately be sent as an alert to all available truckers in the vicinity or desired radius. In exemplary embodiments, the first provider that acknowledges the shipping service request will get the task. Upon task assignment, the request will be removed from the active hauling requests. In exemplary embodiments, the system presents to the customer an ETA for the truck arrival. Upon loading the cargo onto the truck, the customer and driver will acknowledge within the system the status of the cargo as being in transit. Upon cargo delivery the trucker and customer can approve the delivery and payment may be credited to the trucker's account.

In operation, the communications and on-demand trucking system receives reservations from cargo owners/customers. The reservation criteria entered by the customer include a customer's location or any desired location, any service time constraints, number of pallets or boxes to be hauled, the weight and value of the cargo in total or by individual boxes or groups of boxes, the contents of the cargo, and an agreed upon payment schedule required to transport the cargo to a desired destination. Prospective customers can enter their preferred cargo delivery request details. The system may post online at least a portion of the availability information relating to various gasoline fill services, and the payment schedule may be determined prior to the posting of the availability information. In exemplary embodiments, the payment schedule includes a cost per shipment or cost by unit of weight.

The system can then receive reservation offers from a plurality of independent cargo hauling providers. In exemplary embodiments, each of the reservation offers includes an agreement to a specific hauling request and a predetermined payment schedule. The system then selects a number of the received hauling requests such that the selected requests collectively are consistent with the reservation criteria entered by identified customers/cargo owners. The system then communicates hauling offers from one or more independent hauling vehicle operators to provide the cargo hauling service. The system automatically identifies the customer's location and available hauling providers in the area.

As with the communications and delivery system 400, the communications and on-demand trucking system facilitates registration of cargo hauling providers, creating a registered trucker network or fleet, nation-wide or worldwide, to accommodate cargo hauling requests from any region. Registered cargo hauling providers could enter their personal or company details and payment methods, such as credit card and/or PayPal. The system could also facilitate cooperation between registered cargo hauling providers and banks or credit card companies so the cargo hauling providers could provide credit or other financing to their customers. Worldwide operation and support could also be provided.

In exemplary embodiments, the communications and on-demand trucking system receives any changes in the reservation criteria and communicates the changes to each of the independent providers associated with the order. After a customer and cargo hauling provider agree to the terms of a cargo hauling order, the system dispatches the trucker to the customer's location or any other location and notifies the customer of the ETA as well as the actual arrival time of the cargo haul service to the customer's location. The system may notify the customer of the trucker's ETA and show on the screen of the user's personal computing device 40 or web site GPS based map, the trucker's progress toward the customer's location including updating the ETA accordingly. The system may also notify the customer of the actual delivery of the cargo. In exemplary embodiments, the truck drive may confirm delivery of the cargo to the desired destination by a mobile app or internet web site. Upon completion of the cargo delivery, the system automatically provides an invoice to the customer. In exemplary embodiments, the invoice includes a graphic description of the route that was made, number of miles and the total cost.

Thus, it is seen that electronic circuits and communications systems are provided, including systems and methods of remote disablement, emergency communication, categorized delivery, on-demand fueling, on-demand trucking, and altitude detection and airplane mode activation. It should be understood that any of the foregoing configurations and specialized components or connections may be interchangeably used with any of the systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the present disclosure.

What is claimed is:
1. A communications system comprising:
one or more personal computing devices;
each of the one or more personal computing devices housing an electronic circuit, the electronic circuit comprising:
a private unit including a network connection communicatively connecting to a private network;
a public unit including a network connection communicatively connecting to a public network;
a process subsystem;
a control block;
a crypto-block including a crypto-engine providing private communication protocol encryption;

an interconnect communicatively connecting the process subsystem to the control block and the crypto-block; and a barrier selectively communicatively connecting the private unit and the public unit, the barrier separating the private unit from the public unit for security while serving as an interconnect to communicatively connect the private unit and the public unit to enable non-secure communications and to secure communications via private encrypted protocol with other electronic circuits embedded within mobile devices; and an emergency communications system communicatively connected to the electronic circuit, the emergency communications system tracking and identifying a location of each personal computing device;

wherein the emergency communications system responds to a malfunction of each personal computing device or an interruption of a communications link with each personal computing device by sending an emergency transmission via satellite and enables tracking via a unique sequence code; and wherein the emergency communications system determines the shortest route to reach each personal computing device using a combination of tracking points; and wherein the emergency transmission is transmitted to a plurality of electronic circuits within a plurality of personal computing devices worldwide using a satellite network and then transferred to a main emergency server.

2. The communications system of claim 1 further comprising an antenna embedded within the electronic circuit.

3. The communications system of claim 1 further comprising an antenna located outside the electronic circuit and communicatively connected to the electronic circuit.

4. The communications system of claim 1 wherein the emergency communications system records a user's vital signs data and transmits the user's vital signs data to a remote center for assessment by one or more medical professionals.

5. The communications system of claim 1 further comprising an SOS button which launches an emergency sequence for location and tracking when activated.

6. The communications system of claim 5 wherein the emergency communications system switches to proprietary lowest power consumption mode upon activation of the SOS button.

7. The communications system of claim 1 wherein the emergency communications system communicates directly with a satellite network and operates in areas that are out of cellular and wireless range.

8. The communications system of claim 1 wherein the emergency communications system put a user's personal computing device on power saving mode to maximize battery life.

9. The communications system of claim 1 wherein the emergency communications system controls every power related operation of a user's personal computing device.

10. The communications system of claim 1 wherein the emergency communications system transmits a last location signal at a pre-determined time period before battery power runs out.

11. A communications system comprising:
one or more personal computing devices;
each of the one or more personal computing devices housing an electronic circuit, the electronic circuit comprising:

a private unit including a network connection communicatively connecting to a private network;

a public unit including a network connection communicatively connecting to a public network;

a process subsystem;

a control block;

a crypto-block including a crypto-engine providing private communication protocol encryption;

an interconnect communicatively connecting the process subsystem to the control block and the crypto-block; and a barrier selectively communicatively connecting the private unit and the public unit, the barrier separating the private unit from the public unit for security while serving as an interconnect to communicatively connect the private unit and the public unit to enable non-secure communications and to secure communications via private encrypted protocol with other electronic circuits embedded within mobile devices; and an emergency communications system communicatively connected to the electronic circuit, the emergency communications system tracking and identifying a location of each personal computing device and having an SOS button which launches an emergency sequence for location and tracking when activated;

wherein the emergency communications system responds to a malfunction of each personal computing device or an interruption of a communications link with each personal computing device or activation of the SOS button by starting an emergency procedure, the emergency procedure comprising:

sending an emergency transmission via satellite and enables tracking via a unique sequence code;

controlling every power related operation of a user's personal computing device;

putting a user's personal computing device on power saving mode to maximize battery life;

detecting battery exhaustion time; and transmitting a last location signal at a pre-determined time period before battery power runs out; and wherein the emergency transmission is transmitted to a plurality of electronic circuits within a plurality of personal computing devices worldwide using a satellite network and then transferred to a main emergency server.

12. The communications systems of claim of claim 11 wherein the emergency communications system switches to proprietary lowest power consumption mode upon activation of the SOS button.

13. The communications systems of claim of claim 11 wherein the emergency communications system disables a majority of a user's personal computing device or the entire personal computing device.

14. The communications systems of claim of claim 11 wherein the emergency communications system transmits a forecasted location of a user's personal computing device based on prior movement.

15. The communications systems of claim of claim 11 wherein the last location signal is transmitted immediately before the user's personal computing device shuts off.

16. The communications systems of claim of claim 11 wherein the emergency communications system further comprises a capacitor and the emergency communications system continues to send the emergency transmission after battery power is exhausted.

17. The communications systems of claim of claim 11 wherein the emergency communications system adjusts a pulse of the emergency transmission, thereby creating longer intervals to extend emergency transmission time.

18. A communications system comprising:
one or more personal computing devices;
each of the one or more personal computing devices housing an electronic circuit, the electronic circuit comprising:
a private unit including a network connection communicatively connecting to a private network;
a public unit including a network connection communicatively connecting to a public network;
a process subsystem;
a control block;
a crypto-block including a crypto-engine providing private communication protocol encryption;
an interconnect communicatively connecting the process subsystem to the control block and the crypto-block; and
a barrier selectively communicatively connecting the private unit and the public unit, the barrier separating the private unit from the public unit for security while serving as an interconnect to communicatively connect the private unit and the public unit to enable non-secure communications and to secure communications via private encrypted protocol with other electronic circuits embedded within mobile devices; and
an emergency communications system communicatively connected to the electronic circuit, the emergency communications system tracking and identifying a location of each personal computing device and having an SOS button which launches an emergency sequence for location and tracking when activated;
wherein the emergency communications system responds to a malfunction of each personal computing device or an interruption of a communications link with each personal computing device or activation of the SOS button by starting an emergency procedure including sending an emergency transmission via satellite or short waves and enables tracking via a unique sequence code; and
wherein the emergency transmission is transmitted to a plurality of electronic circuits within a plurality of personal computing devices worldwide using a satellite network and then transferred to a main emergency server.

* * * * *